United States Patent [19]
Tsutsumi et al.

[11] Patent Number: 6,003,308
[45] Date of Patent: Dec. 21, 1999

[54] AIR-FUEL RATIO CONTROL SYSTEM FOR INTERNAL COMBUSTION ENGINES

[75] Inventors: Kojiro Tsutsumi; Asao Ukai; Naoko Miyatake; Katsushi Watanabe, all of Wako, Japan

[73] Assignee: Honda Giken Kogyo Kabushiki Kaisha, Tokyo, Japan

[21] Appl. No.: 08/959,980

[22] Filed: Oct. 29, 1997

[30] Foreign Application Priority Data

Oct. 29, 1996 [JP] Japan .................................. 8-302346
Oct. 29, 1996 [JP] Japan .................................. 8-302347
Oct. 29, 1996 [JP] Japan .................................. 8-302348

[51] Int. Cl.$^6$ .................................................. F01N 3/28
[52] U.S. Cl. ............................ 60/276; 60/277; 60/285
[58] Field of Search .......................... 60/274, 276, 277, 60/285

[56] References Cited

U.S. PATENT DOCUMENTS 5,609,023  3/1997  Katoh et al. ........................ 60/285 X
5,678,402 10/1997  Kitagawa et al. ...................... 60/276
5,735,119  4/1998  Asanuma et al. ..................... 60/276

*Primary Examiner*—Tony M. Argenbright
*Attorney, Agent, or Firm*—Nikaido Marmelstein Murray & Oram LLP

[57] ABSTRACT

An air-fuel ratio control system for an internal combustion engine has an exhaust gas-purifying device arranged in the exhaust system of the engine. An oxygen concentration sensor is arranged either in the exhaust system at a location downstream of the exhaust gas-purifying device or in the exhaust gas-purifying device, and an ECU periodically changes the air-fuel ratio of a mixture supplied to the engine alternately to a rich side and to a lean side with respect to a stoichiometric air-fuel ratio. The purification capacity of the exhaust gas-purifying device is determined based on an output from the oxygen concentration sensor. The repetition period of the periodical changing of the air-fuel ratio is shortened as the determined purification capacity is deteriorated.

10 Claims, 17 Drawing Sheets

AIR-FUEL RATIO CONTROL SYSTEM FOR INTERNAL COMBUSTION ENGINES

BACKGROUND OF THE INVENTION

1. Field of the Invention

This invention relates to an air-fuel ratio control system for internal combustion engines, and more particularly to an air-fuel ratio control system of this kind, which forcibly changes the air-fuel ratio of a mixture supplied to the engine, to thereby improve exhaust emission characteristics of the engine.

2. Prior Art

There is conventionally known a method of forcibly changing the air-fuel ratio of a mixture supplied to an internal combustion engine (hereinafter referred to as "perturbation of the air-fuel ratio"), in order to improve the purification rate of an exhaust gas-purifying device which purifies exhaust gases emitted from the engine by means of a catalyst. Further, there has been proposed a method of controlling the mode of the perturbation of the air-fuel ratio, for example, by Japanese Laid-Open Patent Publication (Kokai) No. 2-11841, which controls, e.g. the central value of the perturbed air-fuel ratio, the ratio between a time period during which the air-fuel ratio is changed to the rich side (enriching period) and a time period during which the air-fuel ratio is changed to the lean side (leaning period), etc., in response to an output from an oxygen concentration sensor arranged in the exhaust system at a location downstream of the exhaust gas-purifying device. According to the proposed method, the central value of the ratio between the enriching period and the leaning period is set to 1, and a correction amount for correcting a deviation of the actual ratio from the central value is set to a value proportional to the difference between the output from the oxygen concentration sensor and a reference value thereof.

The above proposed method, however, does not contemplate deterioration of the catalyst accommodated in the exhaust gas-purifying device, i.e. a change in the oxygen storage capacity of the catalyst. As a result, in some cases, the air-fuel ratio is forcibly changed to such an extent as exceeds the oxygen storage capacity of the catalyst, which can degrade exhaust emission characteristics of the engine.

Further, according to the proposed method, when the difference between the output from the oxygen concentration sensor and the reference value is small, the correction amount of the above ratio is also small. Therefore, the time period over which the air-fuel ratio is held on the lean side can become long to such an extent as exceeds the storage capacity of the exhaust gas-purifying device, or conversely, the time period over which the air-fuel ratio is held on the rich side can become long with no oxygen stored in the catalyst, which results in degraded exhaust emission characteristics of the engine.

SUMMARY OF THE INVENTION

It is a first object of the invention to provide an air-fuel ratio control system for internal combustion engines, which is capable of carrying out perturbation of the air-fuel ratio of a mixture supplied to the engine in a manner suitable for the purification capacity of the exhaust gas-purifying device, to thereby enable the exhaust gas-purifying device to exhibit its performance to the maximum extent as well as improve exhaust emission characteristics of the engine.

It is a second object of the invention to provide an air-fuel ratio control system for internal combustion engines, which is capable of quickly changing the mode of the perturbation of the air-fuel ratio according to the oxygen storage capacity of the catalyst accommodated in the exhaust gas-purifying device, to thereby maintain good exhaust emission characteristics of the engine.

To attain the first object, according to a first aspect of the invention, there is provided an air-fuel ratio control system for an internal combustion engine having an exhaust system, and exhaust gas-purifying means arranged in the exhaust system, including an oxygen concentration sensor arranged either in the exhaust system at a location downstream of the exhaust gas-purifying means or in the exhaust gas-purifying means, and air-fuel ratio perturbation means for periodically changing an air-fuel ratio of a mixture supplied to the engine alternately to a rich side and to a lean side with respect to a stoichiometric air-fuel ratio, the air-fuel ratio control system being characterized by an improvement comprising:

purification capacity-determining means for determining purification capacity of the exhaust gas-purifying means, based on an output from the oxygen concentration sensor; and repetition period-changing means for shortening a repetition period of the periodical changing of the air-fuel ratio by the air-fuel ratio perturbation means as the purification capacity determined by the purification capacity-determining means is deteriorated.

According to the air-fuel ratio control system of the first aspect, the purification capacity of the exhaust gas-purifying means is determined based on the output from the oxygen concentration sensor, and the repetition period of the periodical changing of the air-fuel ratio is shortened as the determined purification capacity is deteriorated. As a result, the periodical changing of the air-fuel ratio can be carried out in a manner suitable for the purification capacity of the exhaust gas-purifying means which changes with aging or use thereof, to thereby enable exhibiting the purification capacity of the exhaust gas-purifying means to the maximum extent and hence improve exhaust emission characteristics of the engine.

Preferably, the air-fuel ratio control system includes an air-fuel ratio sensor arranged in the exhaust system at a location upstream of the exhaust gas-purifying means, for outputting a signal proportional to concentration of oxygen present in exhaust gases emitted from the engine, and feedback control means for carrying out feedback control of the air-fuel ratio of the mixture supplied to the engine in response to an output from the air-fuel ratio sensor such that the air-fuel ratio becomes equal to a desired air-fuel ratio, and wherein the air-fuel ratio perturbation means periodically changes the desired air-fuel ratio.

Also preferably, the purification capacity-determining means determines the purification capacity of the exhaust gas-purifying means, based on a time period elapsed from a time point the air-fuel ratio is deflected from the rich side to the lean side with respect to the stoichiometric air-fuel ratio, or vise versa, to a time point the output from the oxygen concentration sensor actually changes.

Preferably, the repetition period-changing means prolongs at least one of a rich-side duration over which the air-fuel ratio is continuously deflected to the rich side by the air-fuel ratio perturbation means and a lean-side duration over which the air-fuel ratio is continuously deflected to the lean side by the air-fuel ratio perturbation means when a rich-side duration correction coefficient for correcting the rich-side duration and a lean-side duration correction coefficient for correcting the lean-side duration both exceed a predetermined value, the repetition period-changing means shortening at least one of the rich-side duration and the lean-side duration when the rich-side duration correction coefficient and the lean-side duration correction coefficient are both below the predetermined value.

More preferably, the air-fuel ratio control system includes learning means for calculating a learned value of the rich-side duration correction coefficient and the lean-side duration correction coefficient, the learned value being increased or decreased depending upon a relationship between the rich-side and lean-side duration correction coefficients and a predetermined non-corrective value.

Further preferably, the learned value is used as an initial value of the rich-side duration correction coefficient and the lean-side duration correction coefficient.

To attain the first object, according to a second aspect of the invention, there is provided an air-fuel ratio control system for an internal combustion engine having an exhaust system, and exhaust gas-purifying means arranged in the exhaust system, including an oxygen concentration sensor arranged either in the exhaust system at a location downstream of the exhaust gas-purifying means or in the exhaust gas-purifying means, and air-fuel ratio perturbation means for periodically changing an air-fuel ratio of a mixture supplied to the engine alternately to a rich side and to a lean side with respect to a stoichiometric air-fuel ratio, the air-fuel ratio control system being characterized by an improvement comprising:

repetition period-changing means responsive to an output from the oxygen concentration sensor, for changing a rich-side duration over which the air-fuel ratio is continuously deflected to the rich side by the air-fuel ratio perturbation means and a lean-side duration over which the air-fuel ratio is continuously deflected to the lean side by the air-fuel ratio perturbation means independently of each other;

the repetition period-changing means setting at least one of an amount of change of the rich-side duration and an amount of change of the lean-side duration, depending on a difference between the output from the oxygen concentration sensor and a predetermined reference air-fuel ratio.

According to the air-fuel ratio control system of the second aspect, the periodical changing of the air-fuel ratio is carried out such that the purification capacity of the exhaust gas-purifying means is exhibited to the maximum extent to thereby improve exhaust emission characteristics of the engine. Further, even if the central value of the perturbed air-fuel ratio deviates from a desired value, the rich-side duration or the lean-side duration is changed to maintain the actual central value at the optimum value. Still further, even if the rich-side duration or the lean-side duration deviates from the optimum value, the deviation can be promptly corrected.

Preferably, the air-fuel ratio control system includes an air-fuel ratio sensor arranged in the exhaust system at a location upstream of the exhaust gas-purifying means, for outputting a signal proportional to concentration of oxygen present in exhaust gases emitted from the engine, and feedback control means for carrying out feedback control of the air-fuel ratio of the mixture supplied to the engine in response to an output from the air-fuel ratio sensor such that the air-fuel ratio becomes equal to a desired air-fuel ratio, and wherein the air-fuel ratio perturbation means periodically changes the desired air-fuel ratio.

Also preferably, the repetition period-changing means sets at least one of the amount of change of the rich-side duration and the amount of change of the lean-side duration to a larger value as the difference between the output from the oxygen concentration sensor and the predetermined reference air-fuel ratio is larger.

To attain the second object, according to a third aspect of the invention, there is provided an air-fuel ratio control system for an internal combustion engine having an exhaust system, and exhaust gas-purifying means arranged in the exhaust system, including an oxygen concentration sensor arranged either in the exhaust system at a location downstream of the exhaust gas-purifying means or in the exhaust gas-purifying means, and air-fuel ratio perturbation means for periodically changing an air-fuel ratio of a mixture supplied to the engine alternately to a rich side and to a lean side with respect to a stoichiometric air-fuel ratio, the air-fuel ratio control system being characterized by an improvement wherein:

the air-fuel ratio perturbation means includes deflection direction-inverting means for inverting a direction of deflection of the air-fuel ratio when an output from the oxygen concentration sensor exceeds a predetermined range including a reference air-fuel ratio corresponding to the stoichiometric air-fuel ratio.

According to the air-fuel ratio control system of the third aspect, when the output from the oxygen concentration sensor exceeds the predetermined range including the reference air-fuel ratio, the direction of deflection of the air-fuel ratio is inverted. As a result, deviation of the oxygen storage state of the catalyst in the exhaust gas-purifying means can be promptly corrected, to thereby maintain good exhaust emission characteristics of the engine.

Preferably, the air-fuel ratio control system includes an air-fuel ratio sensor arranged in the exhaust system at a location upstream of the exhaust gas-purifying means, for outputting a signal proportional to concentration of oxygen present in exhaust gases emitted from the engine, and feedback control means for carrying out feedback control of the air-fuel ratio of the mixture supplied to the engine in response to an output from the air-fuel ratio sensor such that the air-fuel ratio becomes equal to a desired air-fuel ratio, and wherein the air-fuel ratio perturbation means periodically changes the desired air-fuel ratio.

Also preferably, the deflection direction-inverting means inverts the direction of deflection of the air-fuel ratio when the output from the oxygen concentration sensor exceeds a value obtained by adding a predetermined value to the reference air-fuel ratio corresponding to the stoichiometric air-fuel ratio during a time period over which the air-fuel ratio is continuously deflected to the rich side by the air-fuel ratio perturbation means, while the deflection direction-inverting means inverts the direction of deflection of the air-fuel ratio when the output from the oxygen concentration sensor exceeds a value obtained by subtracting the predetermined value from the reference air-fuel ratio during a time period over which the air-fuel ratio is continuously deflected to the lean side by the air-fuel ratio perturbation means.

In a preferred embodiment of the invention there is provided an air-fuel ratio control system for an internal combustion engine having an exhaust system, and exhaust gas-purifying means arranged in the exhaust system, including an oxygen concentration sensor arranged either in the exhaust system at a location downstream of the exhaust gas-purifying means or in the exhaust gas-purifying means, and air-fuel ratio perturbation means for periodically changing an air-fuel ratio of a mixture supplied to the engine alternately to a rich side and to a lean side with respect to a stoichiometric air-fuel ratio, the air-fuel ratio control system being characterized by an improvement comprising:

repetition period-changing means responsive to an output from the oxygen concentration sensor, for changing a rich-side duration over which the air-fuel ratio is continuously deflected to the rich side by the air-fuel ratio perturbation means and a lean-side duration over which the air-fuel ratio is continuously deflected to the lean side by the air-fuel ratio perturbation means independently of each other;

the repetition period-changing means setting at least one of an amount of change of the rich-side duration and an amount of change of the lean-side duration, to a larger value as a difference between the output from the oxygen concentration sensor and a reference air-fuel ratio corresponding to the stoichiometric air-fuel ratio is larger;

the air-fuel ratio perturbation means including deflection direction-inverting means for inverting a direction of deflection of the air-fuel ratio when an output from the oxygen concentration sensor exceeds a predetermined range including the reference air-fuel ratio.

The above and other objects, features, and advantages of the invention will become more apparent from the following detailed description taken in conjunction with the accompanying drawings.

BRIEF DESCRIPTION OF THE DRAWINGS

FIGS. 12A to 12H collectively form a timing chart useful in explaining the FIGS. 8 and 9 subroutine, in which:

FIG. 12A shows a change in the KCMDSO2 value;

FIG. 12B shows a change in the output SVO2 from the oxygen concentration sensor;

FIG. 12C shows a change in the value of a perturbation flag FPRT;

FIG. 12D shows a change in the value of a delay flag FPRTDLY;

FIG. 12E shows a change in the count value of a delay counter cPRTDLY;

FIG. 12F shows a change in the count value of a down-counting timer tPRT;

FIG. 12G shows a change in the value of a break flag FSO2BREAK; and

FIG. 12H shows a change in the value of an inversion-demanding flag FPRTCNG;

FIGS. 16A to 16C collectively form a timing chart useful in explaining the process of FIGS. 13 and 14, in which:

FIG. 16A shows a change in the SVO2 value;

FIG. 16B shows a change in the KCMDSO2 value; and

FIG. 16C shows changes in the rich-side and lean-side duration correction terms KPRTR and KPRTL;

DETAILED DESCRIPTION

The invention will now be described in detail with reference to the drawings showing an embodiment thereof.

Figure 1:
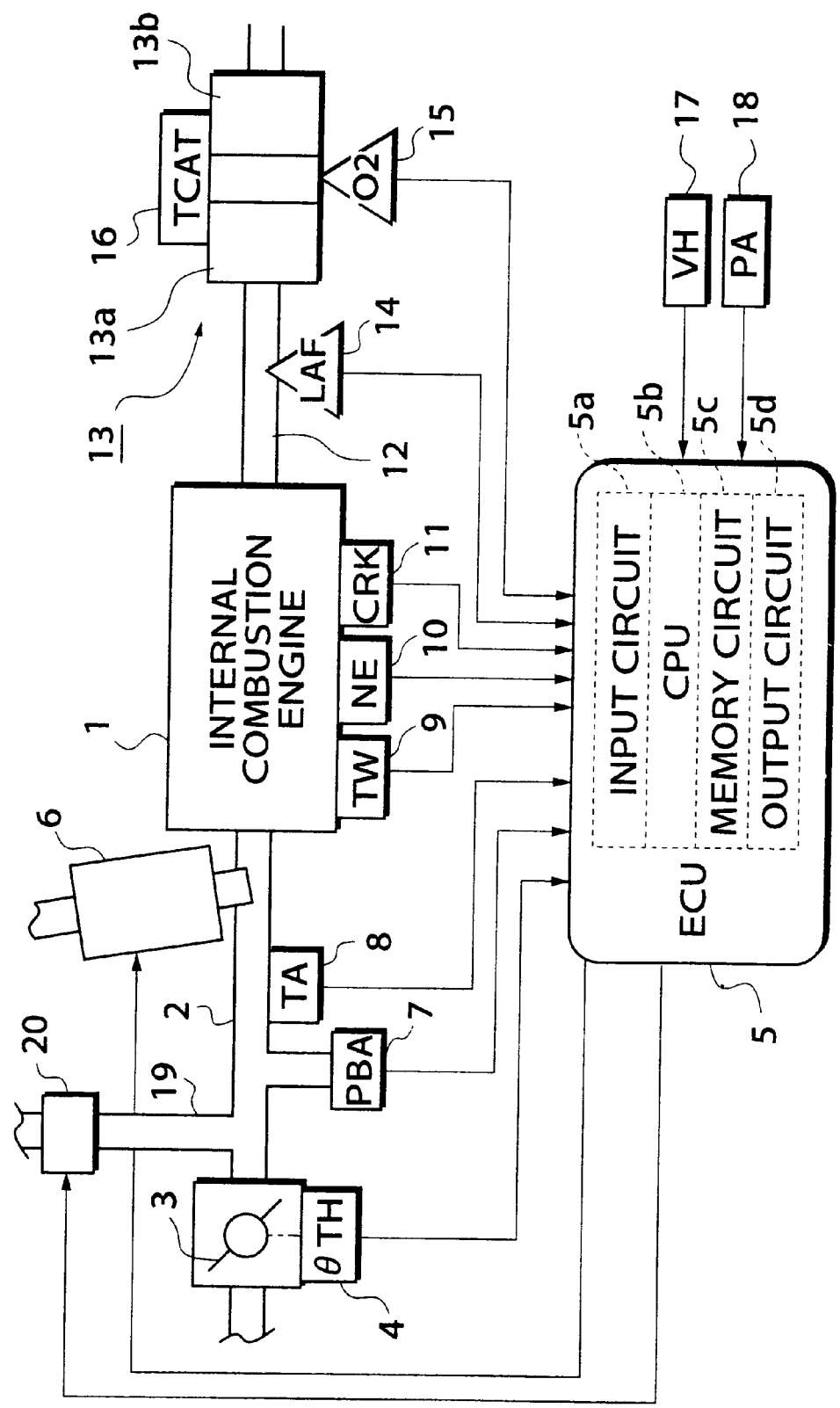
FIG. 1 is a block diagram schematically showing the whole arrangement of an internal combustion engine and an air-fuel ratio control system therefor, according to an embodiment of the invention.

Referring first to FIG. 1, there is schematically illustrated the whole arrangement of an internal combustion engine and an air-fuel ratio control system therefor, according to an embodiment of the invention. In the figure, reference numeral 1 designates an internal combustion engine having four cylinders (hereinafter simply referred to as "the engine"). Connected to the cylinder block of the engine 1 is an intake pipe 2 in which is arranged a throttle valve 3. A throttle valve opening (θTH) sensor 4 is connected to the throttle valve 3, for generating an electric signal indicative of the sensed throttle valve opening θTH and supplying the same to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

Further, an intake pipe absolute pressure (PBA) sensor 7 is provided in communication with the interior of the intake pipe 2, at a location immediately downstream of the throttle valve 3, for supplying an electric signal indicative of the sensed absolute pressure within the intake pipe 2 to the ECU 5. An intake air temperature (TA) sensor 8 is inserted into the interior of the intake pipe 2 at a location downstream of the PBA sensor 7, for supplying an electric signal indicative of the sensed intake air temperature TA to the ECU 5.

An engine coolant temperature (TW) sensor 9 formed of a thermistor or the like is mounted in the cylinder block, for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The NE sensor 10 generates a pulse as a TDC signal pulse at each of predetermined crank angles whenever the crankshaft rotates through 180 degrees, and supplies the same to the ECU 5. The CRK sensor 11 generates a pulse as a CRK signal pulse at each of predetermined crank angles whenever the crankshaft rotates through, e.g. 45 degrees, and supplies the same to the ECU 5.

An exhaust gas-purifying device (catalyst means) 13 is arranged in an exhaust pipe 12 connected to the cylinder block of the engine 1, for purifying exhaust gases emitted from the engine. The exhaust gas-purifying device 13 is comprised of an upstream storage section 13a and a downstream storage section 13b both storing respective catalysts for purifying exhaust gases and accommodated in a single container. A linear-output air-fuel ratio sensor (hereinafter referred to as "the LAF sensor") 14 is arranged in the exhaust pipe 12 at a location upstream of the exhaust gas-purifying device 13, for detecting the air-fuel ratio of exhaust gases, based on the concentration of oxygen present in exhaust gases emitted from the engine or the degree of insufficiency of oxygen in the exhaust gases, and an oxygen concentration (O2) sensor 15 is arranged in the exhaust gas-purifying device 13 at a location intermediate between the upstream and downstream storage sections 13a and 13b. The LAF sensor 14 generates an electric signal almost proportional in value to the air-fuel ratio and supplies the same to the ECU 5. The O2 sensor 15 detects the concentration of oxygen present in exhaust gases, and supplies a signal indicative of the sensed oxygen concentration (SVO2) to the ECU 5. Further, a catalyst temperature (TCAT) sensor 16 is mounted in the exhaust gas-purifying device 13, for supplying an electric signal indicative of the sensed TCAT value to the ECU 5. Alternatively, the downstream O2 sensor 15 may be arranged in the exhaust pipe 12 at a location downstream of the downstream storage section 13b.

Further electrically connected to the ECU 5 are a vehicle speed (VH) sensor 17 for detecting the vehicle speed VH of a vehicle in which the engine 1 is installed, and an atmospheric pressure (PA) sensor 18 for detecting the atmospheric pressure PA. Electric signals indicative of the sensed vehicle speed VH and atmospheric pressure PA are supplied to the ECU 5.

A purge control valve 20 is arranged in a passage 19 via which a canister, not shown, for adsorbing evaporative fuel generated in a fuel tank, not shown, is connected to the intake pipe 2. The purge control valve 20 is electrically connected to the ECU 5 to have its opening/closing operation controlled by a signal therefrom. The purge control valve 20 is opened when the engine 1 is in a predetermined operating condition to supply evaporative fuel stored in the canister into the intake pipe 2.

The ECU 5 is comprised of an input circuit 5a having the functions of shaping the waveforms of input signals from various sensors including ones mentioned above, shifting the voltage levels of sensor output signals to a predetermined level, converting analog signals from analog-output sensors to digital signals, and so forth, a central processing unit (hereinafter referred to as the "the CPU") 5b, a memory circuit 5c storing various operational programs which are executed by the CPU 5b, and for storing results of calculations therefrom, etc., and an output circuit 5d which outputs driving signals to the fuel injection valves 6, etc.

The CPU 5b operates in response to the above-mentioned various engine parameter signals from the various sensors co determine operating conditions in which the engine 1 is operating, such as an air-fuel ratio feedback control region where the air-fuel ratio is controlled in response to the oxygen concentration in the exhaust gases, and open-loop control regions other than the air-fuel ratio feedback control region, and calculates, based upon the determined engine operating conditions, a fuel injection period TOUT over which the fuel injection valves 6 are to be opened by the use of the following equation (1), in synchronism with generation of TDC signal pulses:

$$TOUT = TIM \times KAF \times KCMD \times K1 + K2 \qquad (1)$$

where TIM represents a basic value of the fuel injection period TOUT of the fuel injection valves 6, which is read from a TIM map determined according to the engine rotational speed NE and the intake pipe absolute pressure PBA. The TIM map is set such that map values are read according to the NE and PBA values so as to control the air-fuel ratio of a mixture supplied to the engine to a value substantially equal to a stoichiometric air-fuel ratio.

KAF represents an air-fuel ratio correction coefficient, which is determined in response to an output from the LAF sensor 14 when the engine 1 is operating in the air-fuel ratio feedback control region, while it is set to predetermined values corresponding to respective open-loop control regions of the engine when the engine 1 is in the open-loop control regions.

KCMD represents a desired air-fuel ratio coefficient which is determined according to operating conditions of the engine, as described hereinafter. The KCMD value is proportional to the reciprocal of the air-fuel ratio A/F, i.e. the fuel-air ratio F/A, and set to 1.0 when the air-fuel ratio assumes the stoichiometric air-fuel ratio. Therefore, the KCMD value will be also referred to as the desired equivalent ratio. The perturbation of the air-fuel ratio is carried out by forcibly changing the desired air-fuel ratio coefficient KCMD.

K1 and K2 represent other correction coefficients and correction variables, respectively, which are set according to engine operating parameters to such values as optimize operating characteristics of the engine, such as fuel consumption and engine accelerability.

The CPU 5b supplies driving signals to the fuel injection valves 6 via the output circuit 5d, for opening the same, based on the fuel injection period TOUT obtained by the above calculation, and controls the valving operation of the purge control valve 20, based on the determined engine operating conditions.

Figure 2:
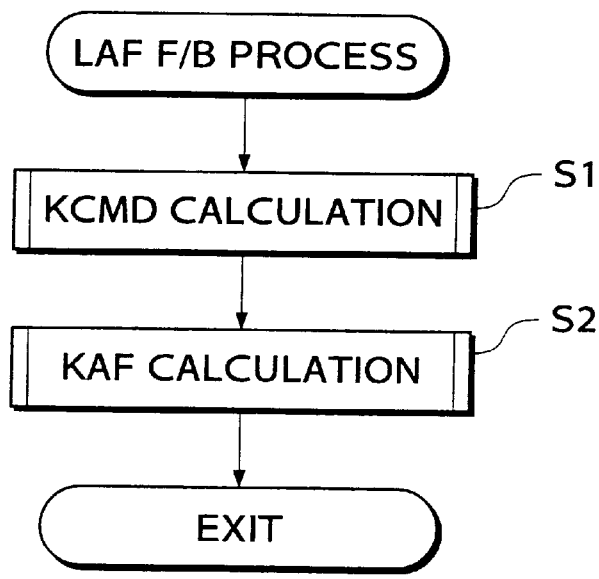
FIG. 2 is a flowchart showing a routine for carrying out air-fuel ratio feedback control in response to an output from a LAF sensor appearing in FIG. 1.

FIG. 2 shows a routine for carrying out air-fuel ratio feedback control based on the output from the LAF sensor 14, which is executed when conditions for executing the air-fuel ratio feedback control are satisfied. This routine is executed in synchronism with generation of TDC signal pulses.

First, at a step S1, a KCMD-calculating process (FIG. 3) for calculating the desired air-fuel ratio coefficient KCMD is carried out, and then, at a step S2, a KAF-calculating process (FIG. 18) for calculating the air-fuel ratio correction coefficient KAF is carried out. These processes will be described in detail hereinbelow.

Figure 3:
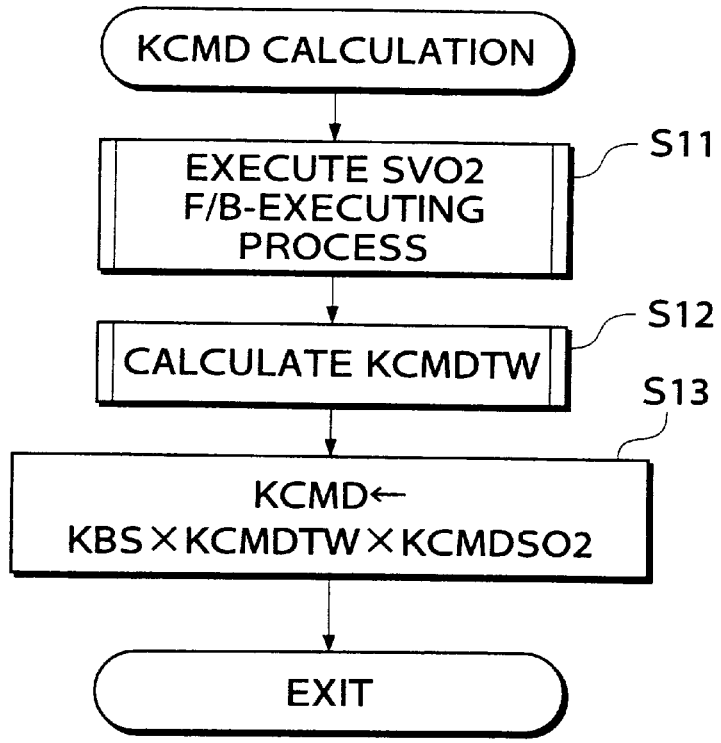
FIG. 3 is a flowchart showing a routine for carrying out KCMD calculation, which is executed at a step S1 in FIG. 2.
Figure 4:
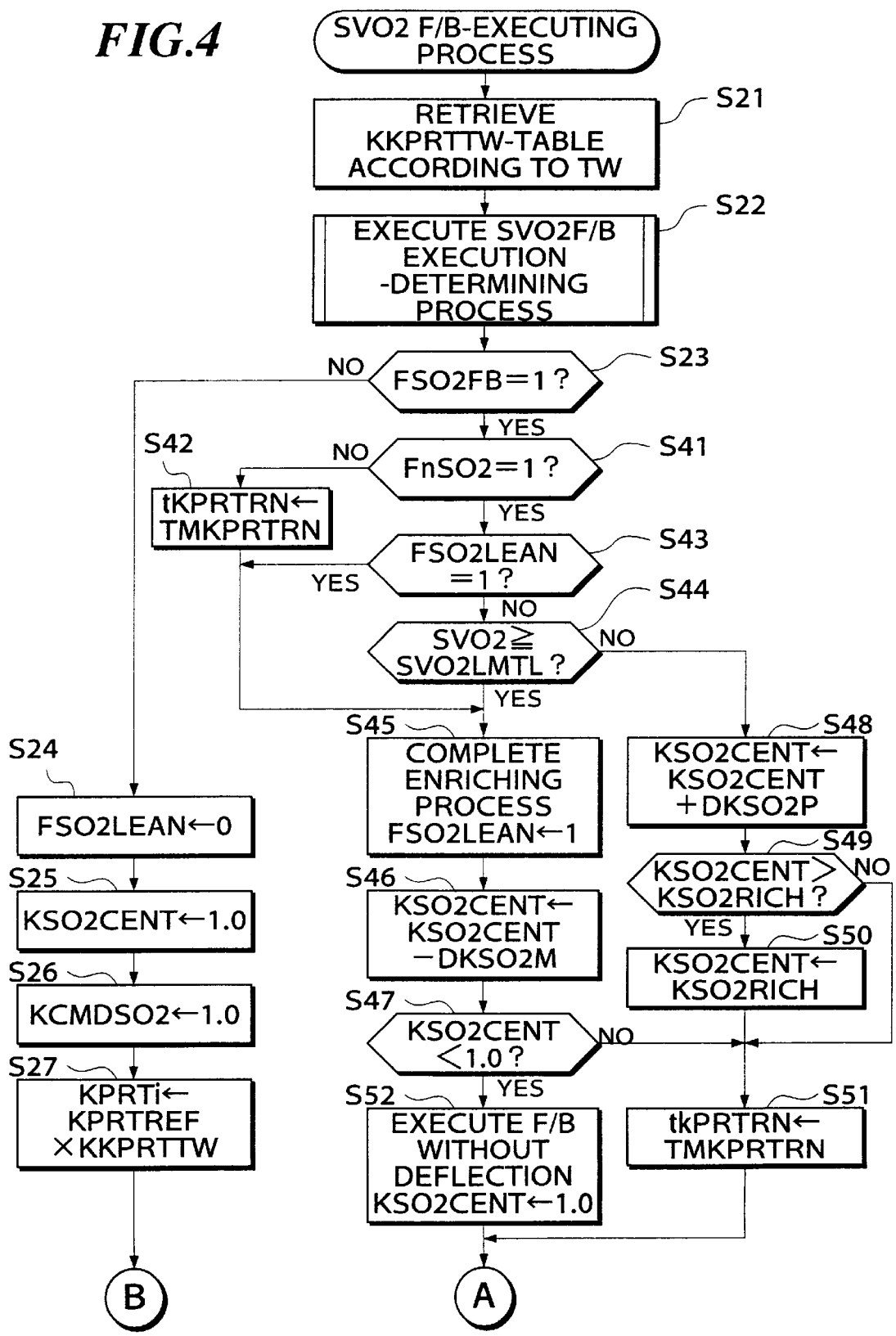
FIG. 4 is a flowchart showing a subroutine for carrying out an SVO2 feedback control-executing process in response to an output SVO2 from an oxygen concentration sensor appearing in FIG. 1, which is executed at a step S11 in FIG. 3.
Figure 5:
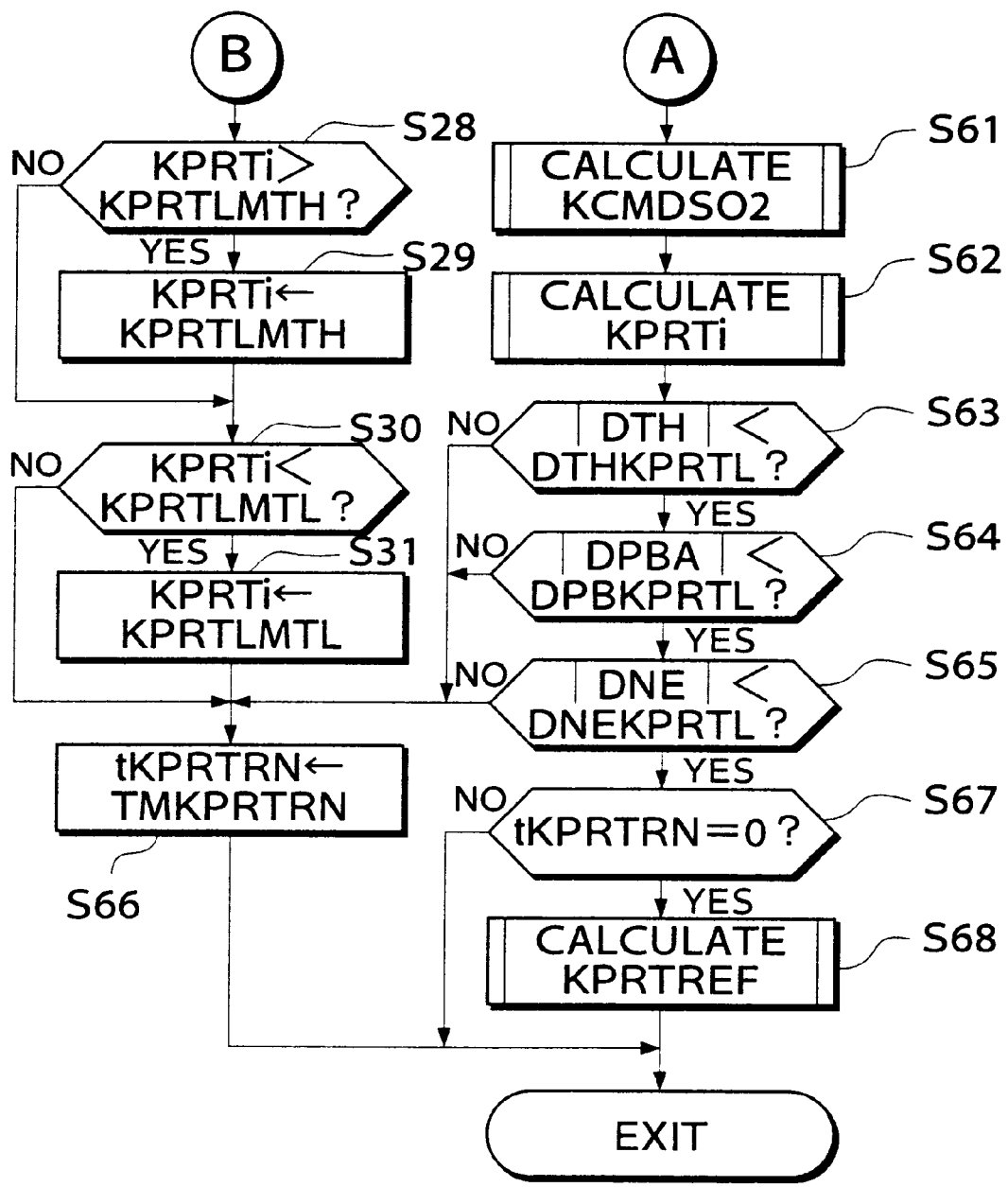
FIG. 5 is a continued part of the flowchart of FIG. 5.

FIG. 3 shows a routine for carrying out the KCMD-calculating process. First, at a step S11, an SVO2 feedback control-executing process, described below with reference to FIGS. 4 and 5, is executed, based on the output SVO2 from the O2 sensor 15. This process is for calculating an SVO2-dependent correction coefficient KCMDSVO2 which is one of correction coefficients for use in calculation of the desired air-fuel ratio coefficient KCMD. At a step S12, a TW-dependent correction coefficient KCMDTW is calculated according to the engine coolant temperature TW, and then the desired air-fuel ratio coefficient KCMD is calculated at a step S13, by the use of the following equation (2):

$$KCMD = KBS \times KCMDTW \times KCMDSO2 \quad (2)$$

where KBS represents a basic value of the desired air-fuel ratio coefficient KCMD, which is determined according to the engine rotational speed NE and the intake pipe absolute pressure PBA.

FIGS. 4 and 5 show a subroutine for carrying out the SVO2 feedback control-executing process, which is executed at the step S11 in FIG. 3.

Figure 6:
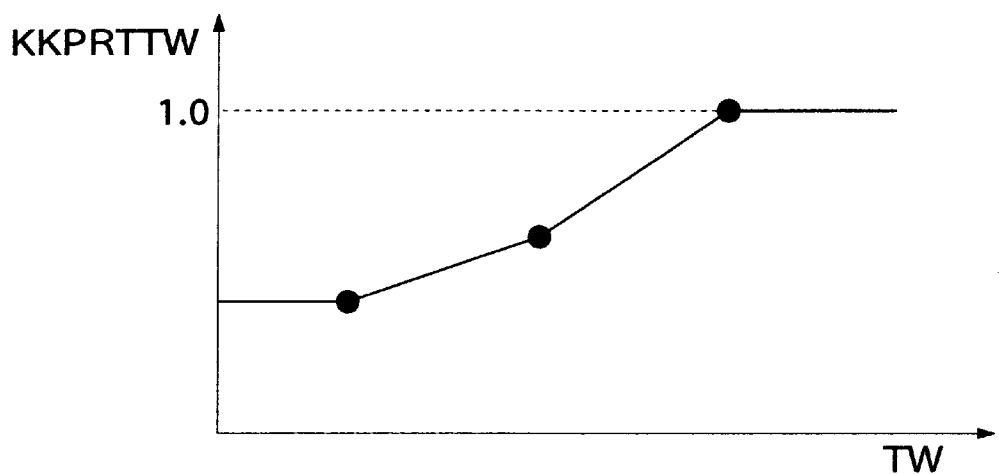
FIG. 6 shows a table which is employed in the subroutine of FIG. 4.

First, at a step S21, a KKPRTTW table, shown in FIG. 6, is retrieved according to the engine coolant temperature TW to determine a coolant temperature-dependent correction coefficient KKPRTTW. The KKPRTTW value is used in calculating a correction coefficient KPRTR for correcting a perturbation rich-side duration TPRTR and a correction coefficient KPRTL for correcting a perturbation lean-side duration TPRTL (the correction coefficients KPRTR and KPRTL will be collectively hereinafter referred to as "the duration correction coefficient KPRTi" (i=R and L); see a step S27 in FIG. 4 and a step S221 in FIG. 14).

At a step S22, an SVO2 F/B control execution condition-determining process is executed, which will be described with reference to FIG. 7. This process is for determining whether or not conditions for calculating the SVO2-dependent correction coefficient KCMDSVO2 in response to the SVO2 value from the O2 sensor 15 are satisfied.

Figure 7:
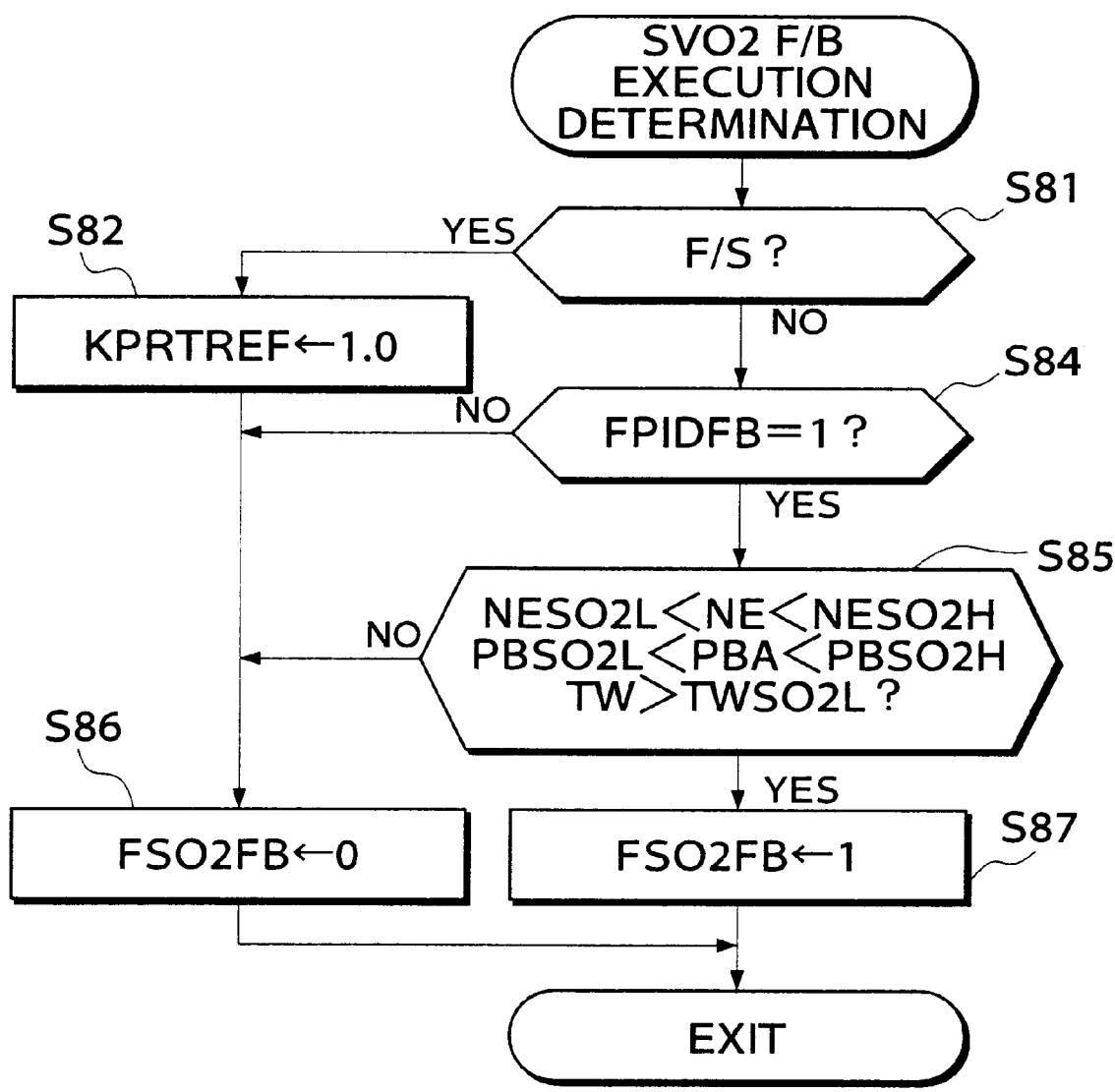
FIG. 7 is a flowchart showing a subroutine for determining satisfaction of conditions for SVO2 feedback control, which is executed at a step S22 in FIG. 4.

At a step S81 in FIG. 7, it is determined whether or not a predetermined fail-safe process is being carried out. If the fail-safe process is being carried out, a learned value KPRTREF of the duration correction coefficient KPRTi is set to 1.0 at a step S82, which means that the conditions for executing the SVO2 feedback control are unsatisfied, and an SVO2 feedback control execution flag FSO2FB is set to "1" at a step S86, followed by terminating the subroutine. On the other hand, if the answer to the question of the step S81 is negative (NO), it is determined at a step S84 whether or not a PID control flag FPIDFB which, when set to "1", indicates that PID control (air-fuel ratio feedback control) is being carried out, assumes "1".

If FPIDFB=0 holds, which means that the PID control is not being carried out, the program proceeds to the step S86. On the other hand, if FPIDFB=1 holds, it is determined at a step S85 whether or not the engine rotational speed NE falls within a range between predetermined upper and lower limit values NESO2H and NESO2L (e.g. 5000 rpm and 1000 rpm, respectively), whether or not the intake pipe absolute pressure PBA falls within a range between predetermined upper and lower limit values PBSO2H and PBSO2L (e.g. 660 mmHg and 210 mmHg, respectively), and at the same time whether or not the engine coolant temperature TW is higher than a predetermined value TWSO2L (e.g. 5° C.). If the answer is negative (NO), the program proceeds to the step S86, whereas if the answer is affirmative (YES), it is determined at a step S87 that the conditions are satisfied, and then the SVO2 F/B execution flag FSO2FB is set to "1", followed by terminating the present routine.

Referring again to FIG. 4, it is determined at a step S23 whether or not the SVO2 F/B execution flag FSO2FB is equal to "1". If FSO2FB=0 holds, which means that the conditions for executing the SVO2 feedback control are unsatisfied, an enrichment completion flag FSO2LEAN, which is set at a step S45 and which, when set to "1", indicates that an air-fuel ratio-enriching process has been completed, is set to "0" at a step S24, and then a central value KSO2CENT of the SVO2-dependent correction coefficient KCMDSO2 (hereinafter also referred to as "the central value of perturbation") and the SVO2-dependent correction coefficient KCMDSO2 are both set to 1.0 at steps S25 and S26. Then, the correction coefficient KKPRTTW determined at the step S21 is applied to the following equation (3), to thereby calculate the duration correction coefficient KPRTi at the step S27:

$$KPRTi = KPRTREF \times KKPRTTW \quad (3)$$

where KPRTREF represents the learned value of the duration correction coefficient KPRTi calculated by executing a process of FIG. 17, described hereinafter.

At the following steps S28 to S31, limit-checking of the KPRTi value calculated at the step S27 is executed. More specifically, if the duration correction coefficient KPRTi exceeds a predetermined upper limit value KPRTLMTH (e.g. 1.7), the KPRTi value is set to the upper limit value KPRTLMTH at the steps S28 and S29, whereas if the KPRTi value is below a predetermined lower limit value KPRTLMTL (e.g. 0.3), the KPRTi value is set to the lower limit value KPRTLMTL at the steps S30 and S31. If KPRTLMTL≦KPRTi≦KPRTLMTH holds, the program immediately proceeds to a step S66. At the step S66, a down-counting timer tKPRTRN, referred to at a step S67, is set to a predetermined time period TMKPRTRN, e.g. 10 sec, and started, followed by terminating the present routine.

If FSO2FB=1 holds at the step S23, which means that the conditions for executing the SVO2 feedback control are satisfied, it is determined at a step S41 whether or not an activation flag FnSO2 which, when set to "1", indicates that the O2 sensor 15 has been activated, assumes "1". If FnSO2=0 holds, which means that the O2 sensor is not activated, the timer tKPRTRN is set to the predetermined time period TMKPRTRN and started at a step S42, followed by the program proceeding to the step S45.

On the other hand, if FnSO2=1 holds at the step S41, which means that the O2 sensor 15 has been activated, it is determined at a step S43 whether or not the enrichment completion flag FSO2LEAN is equal to "1". If FSO2LEAN=1 holds, which means that the air-fuel ratio-enriching process has been completed, the program skips to the step S45. On the other hand, if FSO2LEAN=0 holds, it is determined at a step S44 whether or not the O2 sensor output SVO2 is equal to or larger than a predetermined lower limit value SVO2LMTL. On the other hand, if SVO2<SVO2LMTL holds, which means that the oxygen storage amount of the exhaust gas-purifying device 13 is large, the air-fuel ratio-enriching process at steps S48 to S50 is executed. More specifically, the central value KSO2CENT of perturbation is increased by a predetermined addend DKSO2P at the step S48, and it is determined at the step S49 whether or not the central value KSO2CENT is larger than a predetermined rich-side value KSO2RICH. If KSO2CENT≦KSO2RICH holds, the program skips to a step S51. On the other hand, if KSO2CENT>KSO2RICH holds, the KSO2CENT value is set to the KSO2RICH value at the step S50, followed by the program proceeding to the step S51. In this manner, the central value KSO2CENT is progressively increased to the rich-side predetermined value KSO2RICH.

At the step S51, the timer tKPRTRN is set to the predetermined time period TMKPRTRN and started, similarly to the step S42, and then the program proceeds to a step S61.

The enriching process at the steps S48 to S50 is executed because the oxygen storage amount of the exhaust gas-purifying device 13 becomes larger immediately after execution of fuel cut. Therefore, the air-fuel ratio is enriched to prevent exhaust emission characteristics of the engine from being degraded.

If SVO2≧SVO2LMTL holds at the step S44 after execution of the enriching process, the program proceeds to the step S45, wherein the enrichment completion flag FSO2LEAN is set to "1", and then the central value KSO2CENT is decreased by a predetermined value DKSO2M at a step S46. Then, it is determined at a step S47 whether or not the central value KSO2CENT is smaller than 1.0. If KSO2CENT≧1.0 holds, the program proceeds to the step S51, whereas if KSO2CENT<1.0 holds, the KSO2CENT value is set to 1.0 at a step S52, followed by the program proceeding to the step S61.

Figure 8:
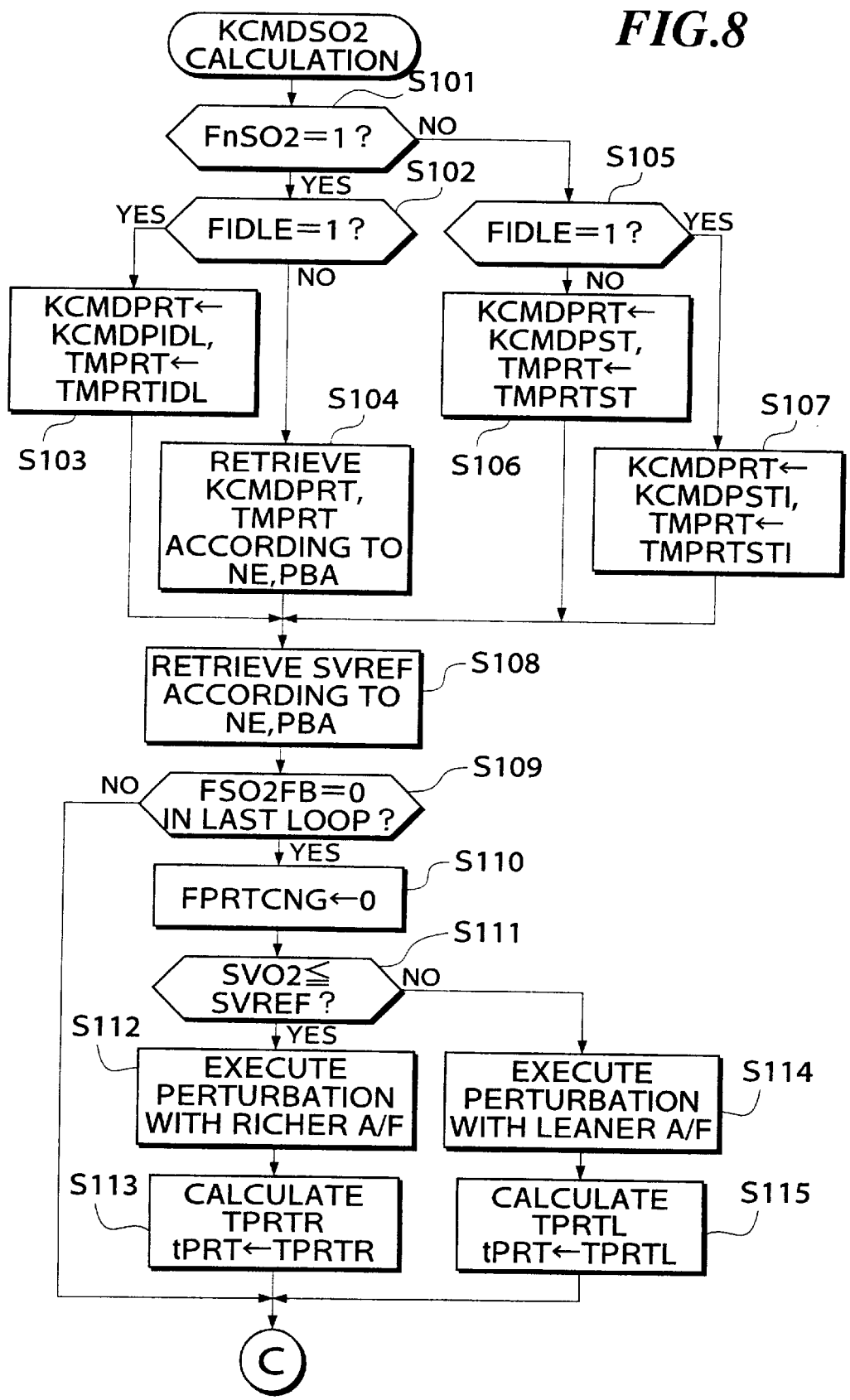
FIG. 8 is a flowchart showing a subroutine for calculating a correction coefficient KCMDSO2, which is executed at a step S61 in FIG. 5.
Figure 9:
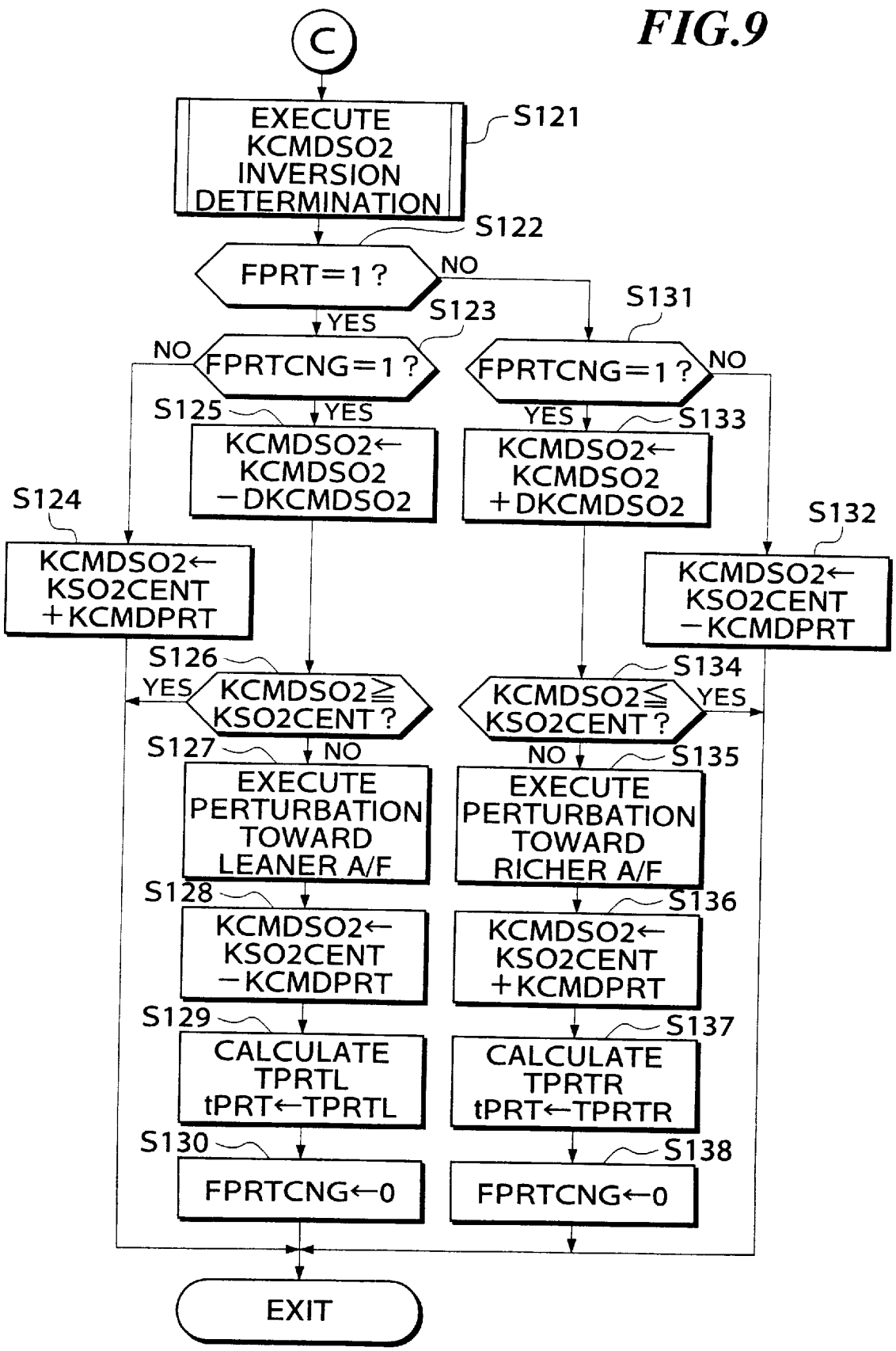
FIG. 9 is a continued part of the flowchart of FIG. 8.
Figure 13:
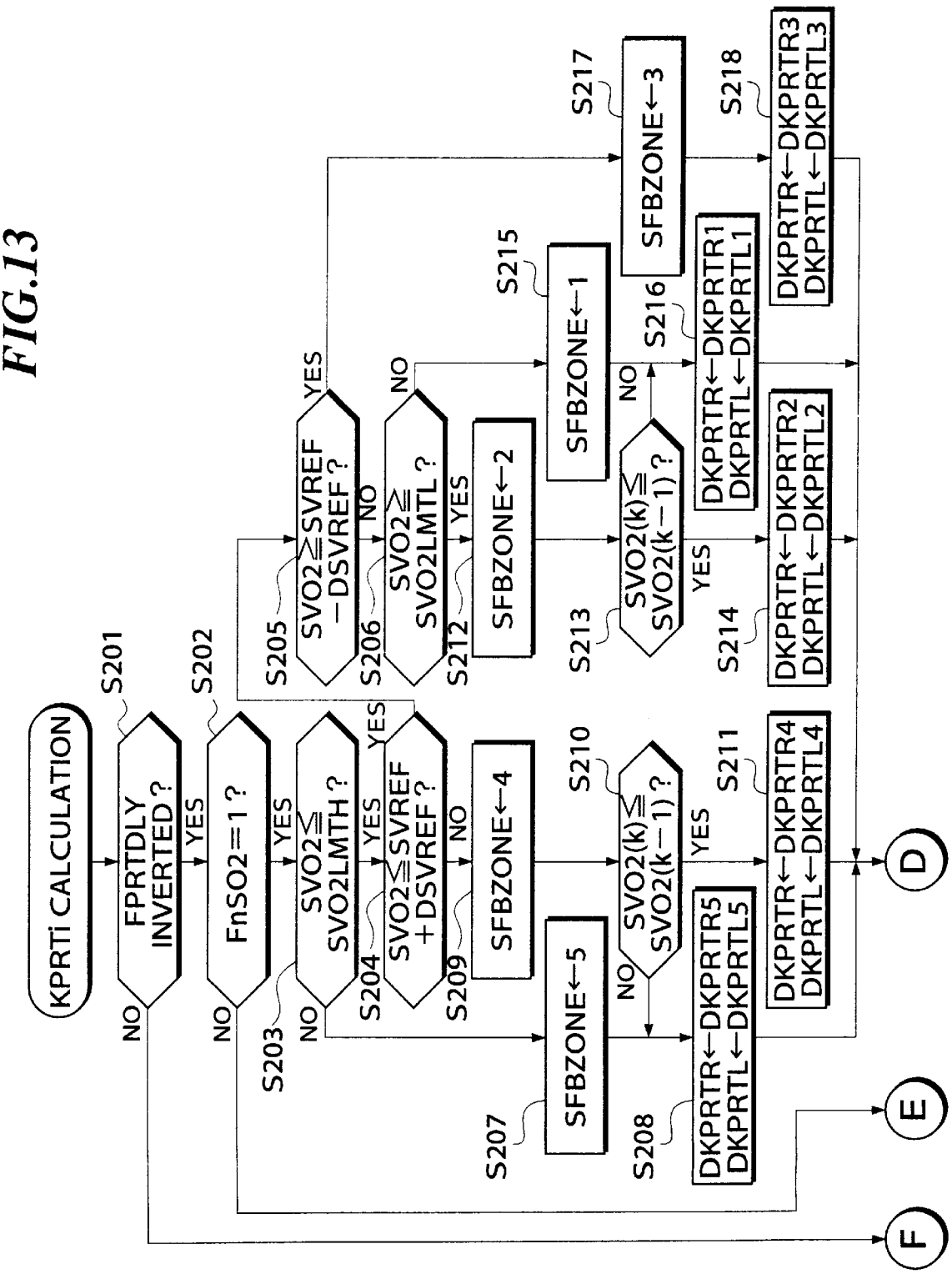
FIG. 13 is a flowchart showing a subroutine for calculating a duration correction coefficient KPRTi (a perturbation rich-side duration TPRTR and a perturbation lean-side duration TPRTL), which is executed at a step S62 in FIG. 5.
Figure 14:
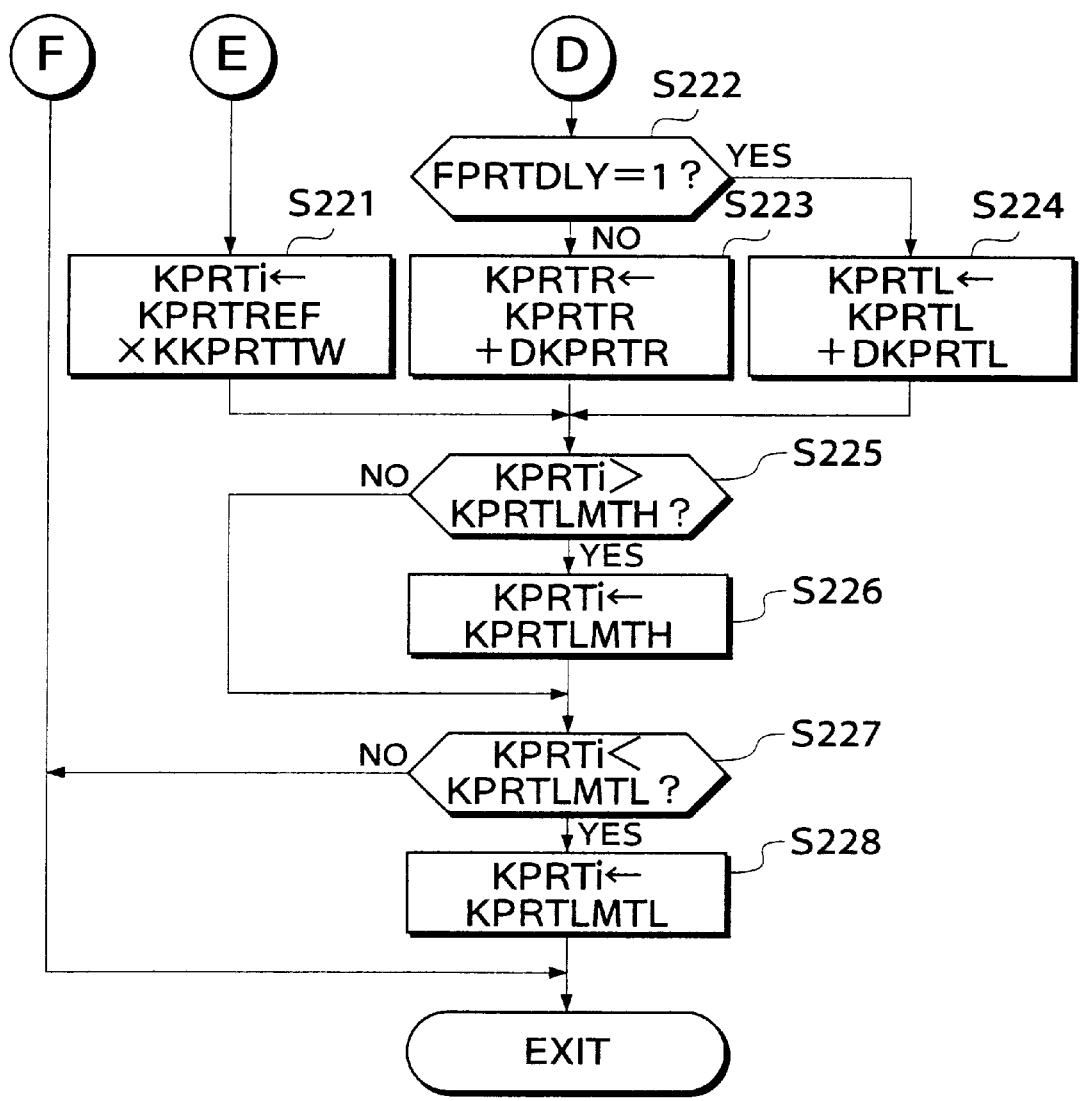
FIG. 14 is a continued part of the flowchart of FIG. 13.

At the step 61, a process of calculating the SVO2-dependent correction coefficient KCMDSVO2, shown in FIGS. 8 and 9, is executed, and at a step S62, a process of calculating the duration correction coefficient KPRTi, shown in FIGS. 13 and 14, is executed. Then, it is determined at a step S63 whether or not the absolute value of a rate of change DTH (=θTH(k)−θTH(k−1)) in the throttle valve opening θTH is smaller than a predetermined value DTHKPRTL (e.g. 3.5 deg). If |DTH|<DTHKPRTL holds, it is determined at a step S64 whether or not the absolute value of a rate of change DPBA (=PBA(k)−PBA(k−1)) in the intake pipe absolute pressure PBA is smaller than a predetermined value DPBKPRTL (e.g. 50 mmHg). If |DPBA|<DPBKPRTL holds, it is determined at a step S65 whether or not the absolute value of a rate of change DNE (=NE(k)−NE(k−1)) in the engine rotational speed NE is smaller than a predetermined value DNEKPRTL (e.g. 300 rpm). The suffixes (k) and (k−1) added to the parameters indicate that the parameters are obtained in the present loop and the immediately preceding loop, respectively. Parameters without the suffixes (k) and (k−1) indicate those obtained in the present loop.

If any of the answers to the questions of the steps S63 to S65 is negative (NO), the program proceeds to the step S66, whereas if all the answers are affirmative (YES), which means that the engine operating condition is stable, it is determined at a step S67 whether or not the count value of the timer tKPRTRN started at the step S66, S42 or S51 is equal to 0. So long as tKPRTRN>0 holds, the program is immediately terminated, whereas if tKPRTRN=0 holds, the process of calculating the learned value KPRTREF (see FIG. 17) is executed at a step S68, followed by terminating the present routine.

FIGS. 8 and 9 show a subroutine for carrying out the KCMDSO2-calculating process which is executed at the step S61 in FIG. 5.

First, it is determined at a step S101 whether or not the activation flag FnSO2 is equal to "1". If FnSO2=0 holds, which means that the O2 sensor 15 is not activated, it is determined at a step S105 whether or not an idling flag FIDLLE which, when set to "1", indicates that the engine is idling, assumes "1". If FIDLE=1 holds, a variation amount KCMDPRT from the central value KSO2CENT of perturbation and a basic value TMPRT of the perturbation rich-side duration TPRTR and the perturbation lean-side duration TPRTL (hereinafter referred to as "the basic duration") are set to respective predetermined values KCMDPSTI and TMPRTSTI (e.g. 500 msec) suitable for idling before activation of the O2 sensor at a step S107, followed by the program proceeding to a step S108. If FIDLE=0 holds, i.e. if the engine is not idling (i.e. in an off-idling state), the variation amount KCMDPRT and the basic duration TMPRT are set to respective predetermined values KCMDPST and TMPRTST (e.g. 300 msec) suitable for off-idling before activation at a step S106, followed by the program proceeding to the step S108.

If FnSO2=1 holds at the step S101, which means that the O2 sensor 15 has been activated, it is determined at a step S102 whether or not the idling flag FIDLE is equal to "1". If FIDLE=1 holds, the variation amount KCMDPRT and the basic duration TMPRT are set to the respective predetermined values KCMDPIDL and TMPRTIDL (e.g. 1 sec) suitable for idling at a step S103, followed by the program proceeding to the step S108. On the other hand, if FIDLE=0 holds, which means the engine is not idling, maps, not shown, which are each set according to the engine rotational speed NE and the intake pipe absolute pressure PBA are retrieved, to thereby determine the variation amount KCMDPRT and the basic duration TMPRT at a step S104.

Figure 10:
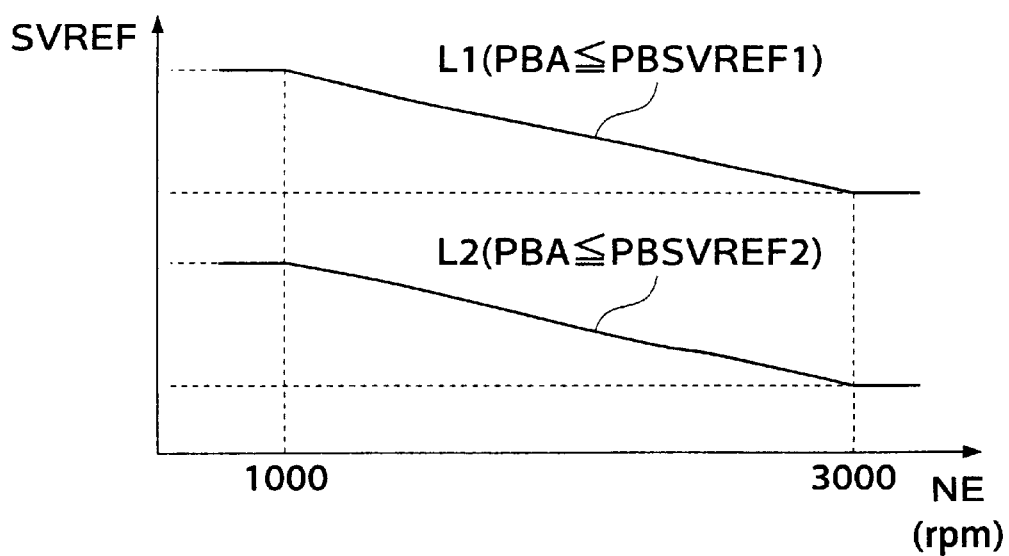
FIG. 10 shows a table used in the FIG. 8 subroutine.

At the step S108, an SVREF table which is set according to the engine rotational speed NE and the intake pipe absolute pressure PBA, as shown in FIG. 10, is retrieved to determine a reference value SVREF of the SVO2 value. In the figure, a line L1 which is employed when the intake pipe absolute pressure PBA is equal to or smaller than a first predetermined value PBSVREF1 (e.g. 110 mmHg) and a line L2 which is employed when the PBA value is equal to or larger than a second predetermined value PBSVREF2 (e.g. 660 mmHg) are set. If PBSVREF1<PBA<PBSVREF2 holds, the reference value SVREF is calculated by interpolation.

At the following step S109, it is determined whether or not the SVO2 F/B execution flag FSO2FB was set to "0" in the last loop of execution of this routine, and if FSO2FB=1 held in the last loop, the program jumps to a step S121. On the other hand, if FSO2FB=0 held in the last loop and at the same time FSO2FB=1 holds in the present loop, the following initializing process at steps S110 to S115 is executed. More specifically, an inversion-demanding flag FPRTCNG which, when set to "1", indicates that inversion of the direction of deflection of the air-fuel ratio (inversion of the air-fuel ratio from a lean side to a rich side or vice versa) is demanded, is set to "0" at the step S110, and then it is determined at the step S111 whether or not the O2 sensor output SVO2 is equal to or smaller than the reference value SVREF.

If SVO2≦SVREF holds, in order to start perturbation with the air-fuel ratio deflected on the rich side, a perturbation flag FPRT which, when set to "1", indicates that a rich-side deflection is being executed, is set to "1" at the step S112. Then, the rich-side duration TPRTR is calculated by the use of the following equation (5), and a down-counting timer tPRT is set to the calculated duration TPRTR and started at the step S113, followed by the program proceeding to the step S121:

$$TPRTR = TMPRT \times KPRTR \qquad (5)$$

where TMPRT represents the basic duration which was set at the step S103, S104, S106 or S107, and KPRTR the rich-side duration correction coefficient to be calculated in a process of FIGS. 13 and 14, described hereinafter.

On the other hand, if SVO2>SVREF holds at the step S111, perturbation should be stared with the air-fuel ratio deflected on the lean side, and therefore the perturbation flag FPRT is set to "0" at the step S114, and the lean-side duration TPRTL is calculated by the use of the following equation (6), and the down-counting timer tPRT is set to the calculated duration TPRTL and started at the step S115, followed by the program proceeding to the step S121:

$$TPRTL=TMPRT \times KPRTL \qquad (6)$$

where KPRTL represents the lean-side duration correction coefficient to be calculated in the process of FIGS. 13 and 14, described hereinafter.

Figure 11:
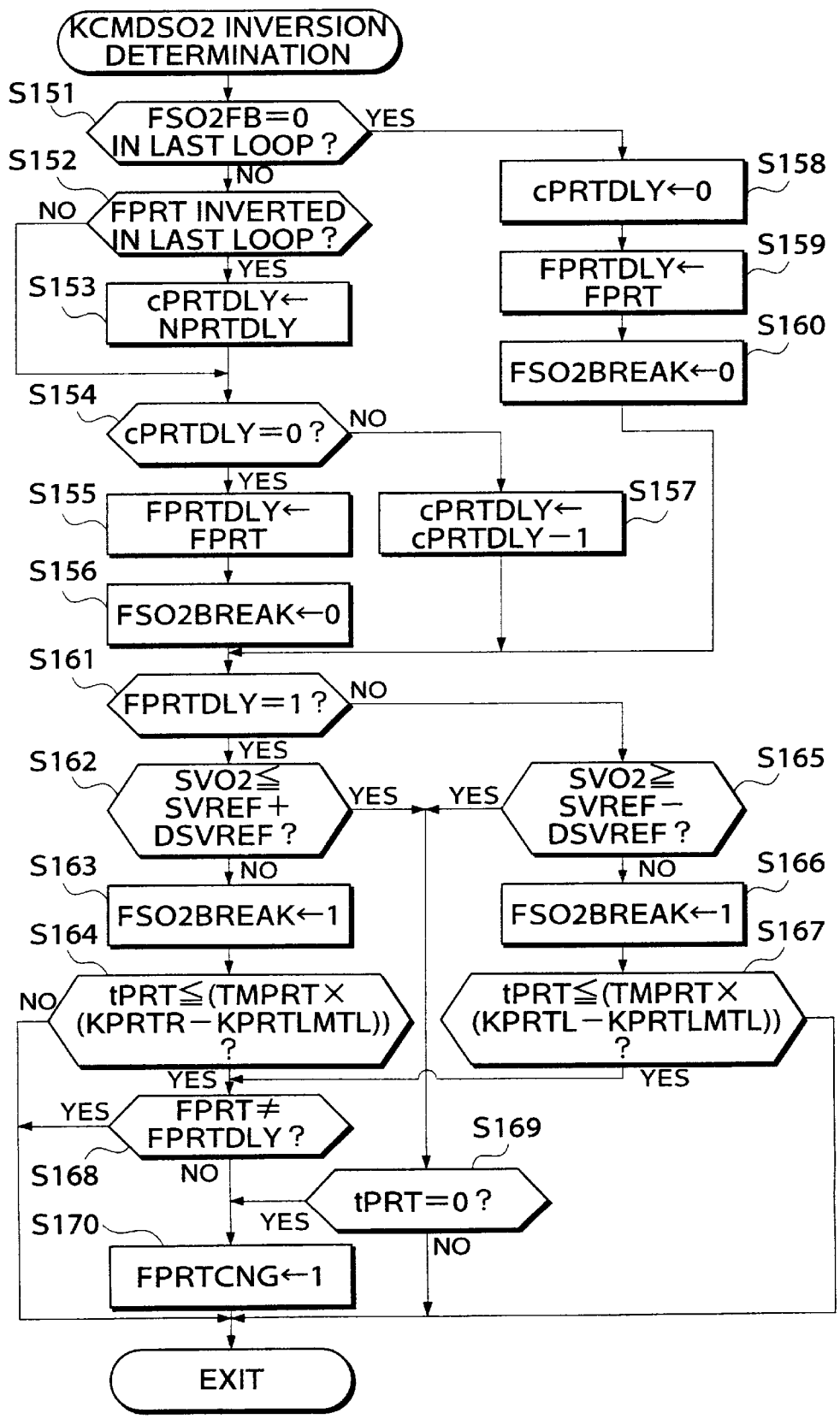
FIG. 11 is a flowchart showing a subroutine for determining inversion of the KCMDSVO2 value, which is executed at a step S121 in FIG. 9.

At the step S121, a KCMDSO2 inversion-determining process, described hereinafter with reference to FIG. 11, is executed to determine whether or not the direction of deflection of the air-fuel ratio should be inverted. If the direction of deflection should be inverted, the inversion-demanding flag FPRTCNG is set to "1".

Figure 12:
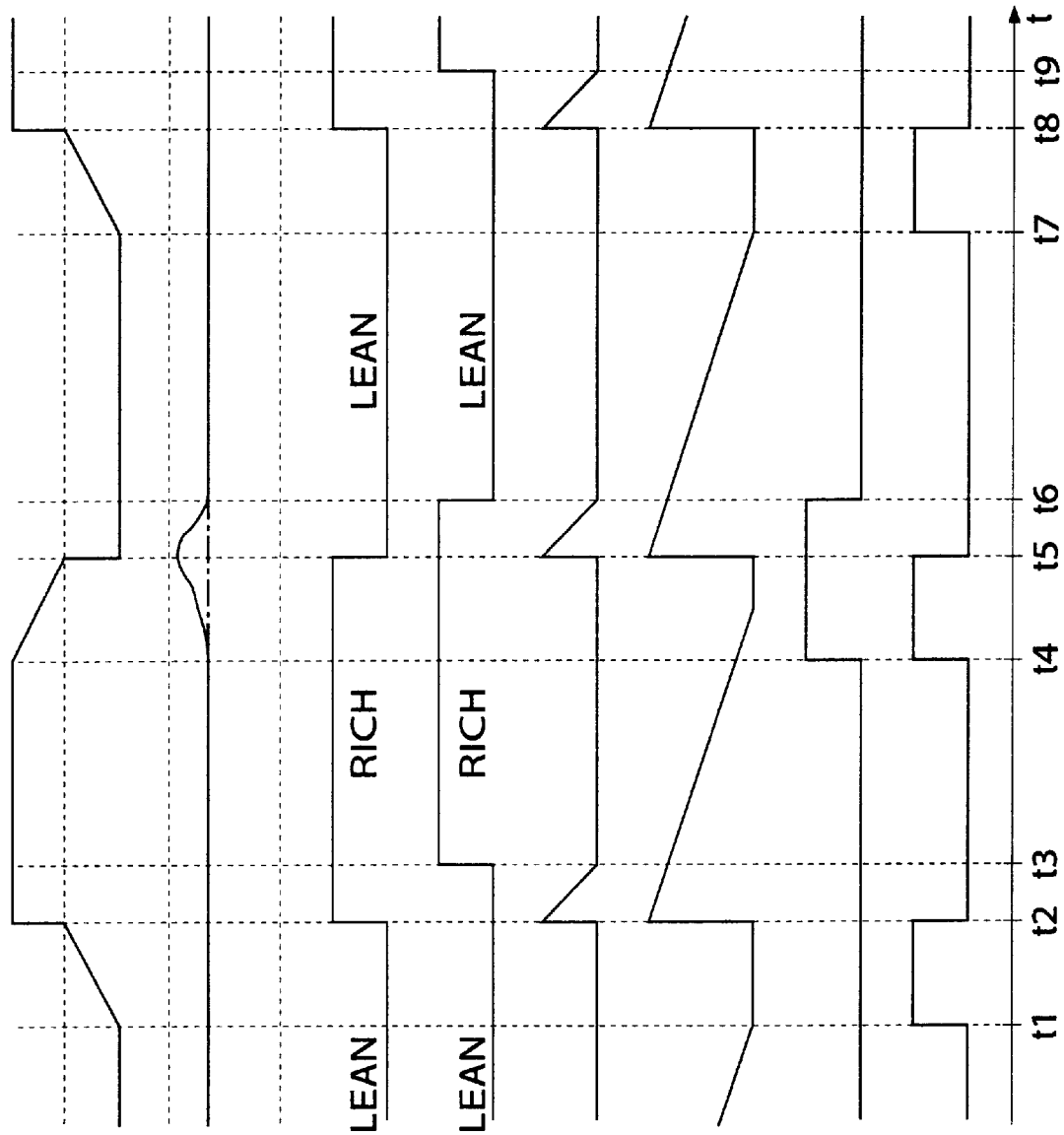

At the following step S122, it is determined whether or not the perturbation flag FPRT is equal to "1". If FPRT=1 holds, i.e. if the control of deflecting the air-fuel ratio to the rich side (rich-side deflection control) is being carried out, it is determined at a step S123 whether or not the inversion-demanding flag FPRTCNG is equal to "1". If FPRTCNG=0 holds, the SVO2-dependent correction coefficient KCMDSO2 is calculated at a step S124 by the use of the following equation (7) (see a time period between time points t2 to t4 in FIG. 12), followed by terminating the present subroutine:

$$KCMDSO2=KSO2CENT+KCMDPRT \qquad (7)$$

where KSO2CENT represents the central value of perturbation (see the steps S46 to S52 in FIG. 4) and KCMDPRT the variation amount set at the steps S103, S104, etc.

If FPRTCNG=1 holds at the step S123, i.e. if the inversion demand is issued, the SVO2-dependent correction coefficient KCMDSO2 is decreased by a predetermined value DKCMDSO2 at a step S125, and then it is determined at a step S126 whether or not the KCMDSO2 value is equal to or larger than the central value KSO2CENT. So long as KCMDSO224 KSO2CENT holds, the program is immediately terminated (see a time period between time points t4 and t5 in FIG. 12). On the other hand, if KCMDSO2<KSO2CENT holds, in order to carry out the control of deflecting the air-fuel ratio to the lean-side (lean side deflection control), the perturbation flag FPRT is set to "0" at a step S127, and the SVO2-dependent correction coefficient KCMDSO2 is calculated at a step S128, by the use of the following equation (8):

$$KCMDSO2=KSO2CENT-KCMDPRT \qquad (8)$$

Then, the lean-side duration TPRTL is calculated by the above equation (6), the timer tPRT is set to the calculated duration TPRTL and started at a step S129, and the inversion-demanding flag FPRTCNG is reset to "0" at a step S130 (see a time point t5 in FIG. 12), followed by terminating the present subroutine.

On the other hand, if FPRT=0 holds at the step S122, i.e. if the lean-side deflection control is being carried out, it is determined at a step S131 whether or not the inversion-demanding flag FPRTCNG is equal to "1". If FPRTCNG=0 holds, the SVO2-dependent correction coefficient KCMDSO2 is calculated at a step S132 by the above equation (8) (see a time period between the time points t5 to t7 in FIG. 12), followed by terminating the present subroutine.

If FPRTCNG=1 holds at the step S131, i.e. if the inversion demand is issued, the SVO2-dependent correction coefficient KCMDSO2 is increased by the predetermined value DKCMDSO2 at a step S133, and then it is determined at a step S134 whether or not the KCMDSO2 value is equal to or smaller than the central value KSO2CENT. So long as KCMDSO2≦KSO2CENT holds, the program is immediately terminated (see a time period between time points t7 and t8 in FIG. 12). On the other hand, if KCMDSO2>KSO2CENT holds, in order to carry out the rich-side deflection control, the perturbation flag FPRT is set to "1" at a step S135, and the SVO2-dependent correction coefficient KCMDSO2 is calculated at a step S136 by the above equation (7).

Then, the rich-side duration TPRTR is calculated by the above equation (5), the timer tPRT is set to the calculated duration TPRTR and started at a step S137, and the inversion-demanding flag FPRTCNG is reset to "0" at a step S138 (see a time point t8 in FIG. 12), followed by terminating the present subroutine.

As described hereinabove, according to the KCMDSO2-calculating process of FIGS. 8 and 9, when the inversion demand is issued, the SVO2-dependent correction coefficient KCMDSO2 is progressively changed toward the central value KSO2CENT, and when it reaches the central value KSO2CENT, the deflection control is started in the direction opposite to the direction of the deflection before the central value KSO2CENT has been reached (see FIG. 12D). By repeatedly executing the deflection control, the KCMDSO2 value is changed as shown in FIG. 12A, to thereby carry out the air-fuel ratio perturbation.

FIG. 11 shows a subroutine for carrying out the KCMDSO2 inversion-determining process, which is executed at the step S121 in FIG. 9.

First, it is determined at a step S151 whether or not the SVO2 F/B execution flag FSO2FB was set to "0" in the last loop of execution of this routine. If FSO2FB=0 held, a delay counter cPRTDLY is set to "0" at a step 158, and a delay flag FPRTDLY (see FIG. 12D) which is set to the same value as the perturbation flag FPRT slightly after the setting of the latter is set to the same value as the perturbation flag FPRT at a step S159. Then, a break flag FSO2BREAK which, when set to "1", indicates that a break state (referred to at steps S164 and S167) has been determined, is set to "0" at a step S160, followed by the program proceeding to a step S161.

On the other hand, if FSO2FB=1 held in the last loop, it is determined at a step S152 whether or not the perturbation flag FPRT was inverted in the last loop. If the flag FPRT was not inverted, the program skips to a step S154, whereas if the flag FPRT was inverted, the delay counter cPRTDLY is set to a predetermined value NPRTDLY (e.g. 8) at a step S153, followed by the program proceeding to the step S154.

At the step S154, it is determined whether or not the count value of the delay counter cPRTDLY is equal to "0". So long as cPRTDLY>0 holds (see time periods between time points t2 and t3, t5 and t6, and t8 and t9 in FIG. 12), the count value of the counter cPRTDLY is decremented by 1 at a step S157, followed by the program proceeding to the step S161. If cPRTDLY=0 holds (see time points t3, t6, and t9 in FIG. 12), the delay flag FPRTDLY is set to the same value as the perturbation flag FPRT at a step S155, and the break flag FSO2BREAK is set to "0" at a step S156, followed by the program proceeding to the step S161.

At the step S161, it is determined whether or not the delay flag FPRTDLY is equal to "1". If FPRTDLY=1 holds, it is determined at a step S162 whether or not the O2 sensor output SVO2 is equal to or smaller than a value obtained by adding a predetermined voltage DSVREF (e.g. 0.06 V) to the reference value SVREF. If the answer is affirmative (YES), it is determined at a step S169 whether or not the count value of the timer tPRT is equal to "0". So long as tPRT>0 holds (before a time point t1 and time periods between time points t2 to t4, and t5 to t7 in FIG. 12), the program is immediately terminated. On the other hand, if tPRT=0 holds (time points t1 and t7 in FIG. 12), the program proceeds to a step S170, wherein the inversion-demanding flag FPRTCNG is set to "1", i.e. the inversion of the direction of deflection of the air-fuel ratio is demanded.

If SVO2>(SVREF+DSVREF) holds at the step S162, the break flag FSO2BREAK is set to "1" at a step S163. According to the present embodiment, a state in which SVO2>(SVREF+DSVREF) holds after the O2 sensor output SVO2 has increased is designated as the "break" state When the SVO2 value decreases so that a relationship of SVO2<(SVREF−DSVREF) holds, referred to hereinafter, this state is also designated as the "break" state. More specifically, when FPRTDLY=1 holds and at the same time the O2 sensor output SVO2 has changed to the rich side beyond the predetermined voltage DSVREF during execution of the rich-side deflection control, it is determined that oxygen stored in the exhaust gas-purifying device 13 has been completely desorbed, and therefore the inversion demand is issued so long as conditions at steps S164 and S168 are satisfied.

At the step S164, it is determined whether or not the count value of the timer tPRT is equal to or smaller than a value (TMPRT×(KPRTR−KPRTLMTL)). The value TMPRT× KPRTR is equal to the rich-side duration TPRTR (calculated by the above equation (5)), and the value TMPRT× KPRTLMTL is equal to the lower limit value TPRTMIN of the rich-side duration TPRTR. Therefore, if tPRT>(TMPRT×(KPRTR−KPRTLMTL)) holds, which means that the rich-side duration TPRTR has not reached the lower limit value TPRTMIN thereof. Therefore, the program is immediately terminated without issuing the inversion demand. This takes into account that if the repetition period of perturbation is too short, a time period required for the exhaust gas-purifying device 13 to reacts to the perturbation is insufficient, which can result in deteriorated purification performance. The step S164 copes with this inconvenience.

If the answer to the question of the step S164 is affirmative (YES), it is further determined at the step S168 whether or not the value of the perturbation flag FPRT is unequal to the value of the delay flag FPRTDLY. If FPRT≠FPRTDLY holds (see time periods between time points t2 and t3, t5 and t6, and t8 and t9 in FIG. 12), which means that the inversion demand has just been issued, the program is terminated without demanding the inversion. On the other hand, if FPRT=FPRTDLY holds, the program proceeds to the step S170, wherein the inversion-demanding flag FPRTCNG is set to "1" (see a time point t4 in FIG. 12), followed by terminating the present routine.

If FPRTDLY≠1 holds at the step S161, steps S165 to S167 are executed, similarly to the steps S162 to S164. More specifically, it is determined at the step S165 whether or not the O2 sensor output SVO2 is equal to or larger than a value obtained by subtracting the predetermined voltage DSVREF from the reference value SVREF. If the answer is affirmative (YES), the program proceeds to the step S169, whereas if SVO2<(SVREF−DSVREF) holds at the step S165, which means that the break state has occurred, the break flag FSO2BREAK is set to "1" at the step S166. In other words, if FPRTDLY=0 holds, which means that the O2 sensor output SVO2 has changed to the lean side beyond the predetermined voltage DSVREF during execution of the lean-side deflection control, it is determined that oxygen has been desorbed in an amount in excess of the oxygen storage capacity of the exhaust gas-purifying device 13. Therefore, if the conditions referred to at the step S167 and the step S168 are satisfied, the inversion demand is issued.

Then, it is determined at the step S167 whether or not the count value of the timer tPRT is equal to or below the value (TMPRT×(KPRTL−KPRTLMTL)). The value TMPRT× KPRTL is equal to the lean-side duration TPRTL (obtained by the equation (6)), and the value TMPRT×KPRTLMTL is equal to the lower limit value TPRTMIN of the lean-side duration TPRTL. Therefore, if tPRT>(TMPRT×(KPRTL−KPRTLMTL)) holds at the step S167, which means that the lean-side duration TPRTL has not reached the lower limit value TPRTMIN thereof. Therefore, the program is immediately terminated without issuing the inversion demand. On the other hand, if the answer is affirmative (YES), the program proceeds to the step S168.

As described hereinabove, according to the process of FIG. 11, when the duration TPRTR or TPRTL has elapsed after execution of inversion of direction of deflection of the air-fuel ratio (see time points t1 and t7 in FIG. 12), or when the break state has occurred even before the lapse of the duration TPRTR or TPRTL (a time point t4 in FIG. 12), the inversion-demanding flag FPRTCNG is set to "1", to thereby issue the inversion demand.

When the break state has occurred, the inversion demand is thus issued even before the duration TPRTR or TPRTL elapses. Therefore, deviation of the oxygen storage state of the exhaust gas-purifying device 13 can be promptly corrected, to thereby maintain good exhaust emission characteristics of the engine.

FIGS. 13 and 14 show a routine for carrying out the KPRTi-calculating process, which is executed at the step S62 in FIG. 5.

First, it is determined a step S201 whether or not the delay flag FPRTDLY has been inverted. If the inversion has not taken place, the program is immediately terminated. That is, a step S202 et seq. are executed only immediately after the delay flag FPRTDLY is inverted.

If the delay flag FPTDLY has been inverted, it is determined at the step S202 whether or not the activation flag FnSO2 is equal to "1". If FnSO2=0 holds, which means that the O2 sensor is not activated yet, the program jumps to a step S221, wherein the duration correction coefficient KPRTi is set to the value obtained by the aforesaid equation (3) (i.e. the learned value KPRTREF×coolant-dependent correction coefficient KKPRTTW), i.e. the KPRTi value is initialized, followed by the program proceeding to a step S225.

Figure 15:
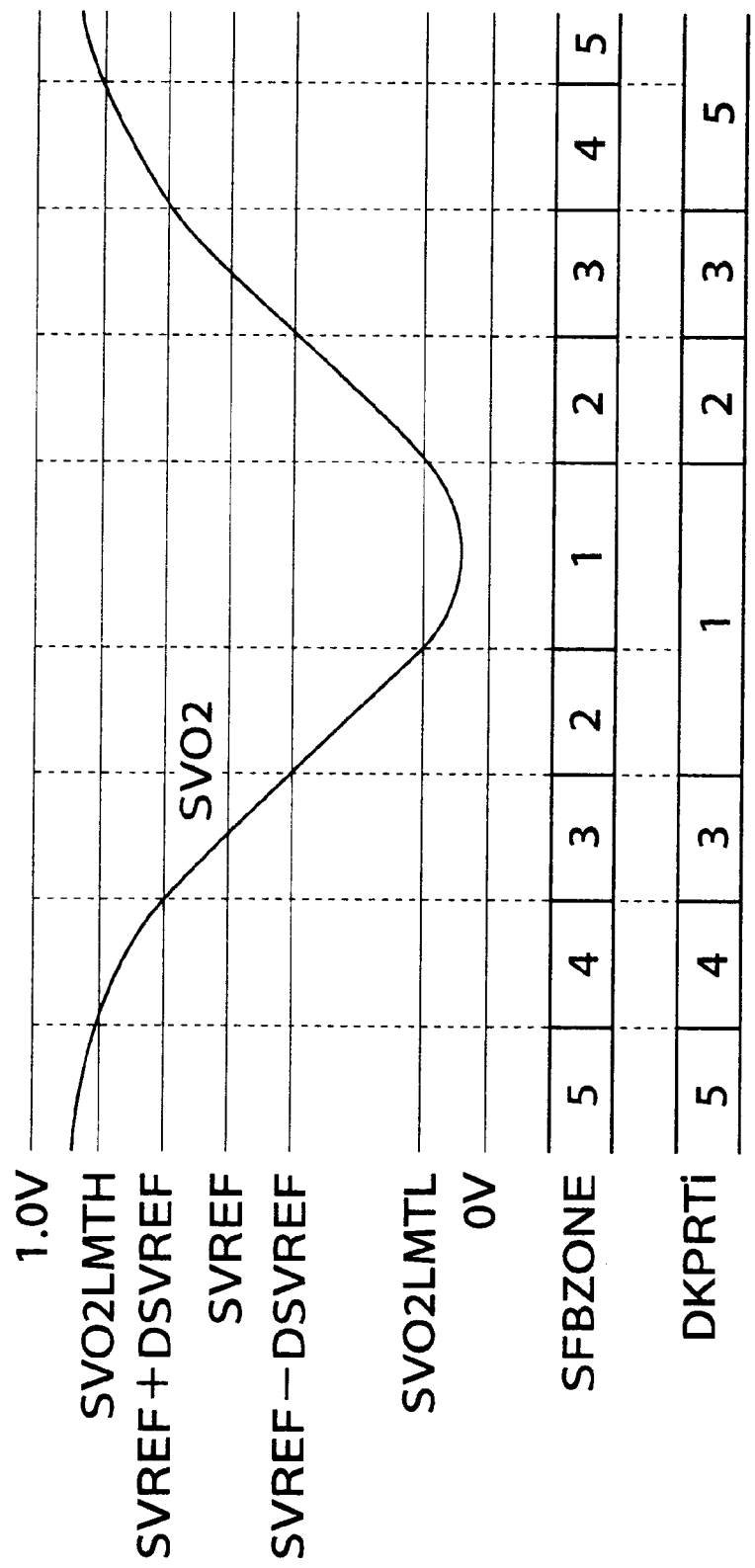
FIG. 15 is a graph useful in explaining a zone parameter SFBZONE which is set in the FIG. 13 subroutine.

If FnSO2=1 holds at the step S202, which means that the O2 sensor 15 has been activated, a zone determination according to the O2 sensor output SVO2 is carried out at steps S203 to S205. More specifically, the O2 sensor output SVO2 is compared with a predetermined upper limit value SVO2LMTH (e.g. 0.85 V), the sum of the reference value SVREF+the predetermined voltage DSVREF, the reference value SVREF, the difference of the reference SVREF−the predetermined voltage DSVREF, and the predetermined lower limit value SVO2LMTL (e.g. 0.2 V), which are in a relationship shown in FIG. 15. If SVO2>SVO2LMTH holds, a zone parameter SFBZONE is set to 5 at the step S203 and a step S207. If (SVREF+DSVREF)<SVO2≦SVO2LMTH holds, the zone parameter SFBZONE is set to 4 at the steps S203 and S204 and a step S209. If (SVREF−DSVERF)≦SVO2≦(SVREF+DSVERF) holds, the zone parameter SFBSVO2 is set to 3 at the steps S203, S204, and S205 and a step S217. If SVLMTL≦SVO2<(SVREF−DSVERF) holds, the zone parameter SFBZONE is set to 2 at the steps S203 to S205, and steps S206 and S212. If SVO2<SVO2LMTL holds, the zone parameter SFBZONE is set to 1 at the steps S203 to S206, and a step S215.

Further, if SFBZONE=4 holds, it is determined at a step S210 whether or not a present value SVO2(k) of the O2 sensor output is equal to or smaller than a last value SVO2(k−1) of the same. If SFBZONE=2 holds, it is determined at a step S213 whether or not the present value SVO2(k) is equal to or larger than the last value SVO2(k−1).

If SFBZONE=5 holds, or if SFBZONE=4 holds and at the same time SVO2(k) >SVO2(k−1) holds, which means that the SVO2 value is being increased, a rich-side correction term DKPRTR and a lean-side correction term DKPRTL are set to fifth predetermined values DKPRTR5 and DKPRTL5, respectively, at a step S208. If SFBZONE=4 holds and at the same time SVO2(k)≦SVO2(k−1) holds, which means that the SVO2 value is being decreased, the rich-side correction term DKPRTR and the lean-side correction term DKPRTL are set to fourth predetermined values DKPRTR4 and DKPRTL4, respectively, at a step S211. If SFBZONE=3 holds, the rich-side correction term DKPRTR and the lean-side correction term DKPRTL are set to third predetermined values DKPRTR3 and DKPRTL3, respectively, at a step S218. If SFBZONE=2 holds and at the same time SVO2(k)≧SVO2(k−1) holds, which means that the SVO2 value is being increased, the rich-side correction term DKPRTR and the lean-side correction term DKPRTL are set to second predetermined values DKPRTR2 and DKPRTL2, respectively, at a step S214. If SFBZONE=1 holds, or if SFBZONE=2 holds and at the same time SVO2(k)<SVO2(k−1) holds, which means that the SVO2 value is being decreased, the rich-side correction term DKPRTR and the lean-side correction term DKPRTL are set to first predetermined values DKPRTR1 and DKPRTL1, respectively, at a step S216.

The first to fifth predetermined values are set such that DKPRTR5<DKPRTR4<0<DKPRTR3<DKPRTR2<DKPRTR1 and DKPRTL1<DKPRTL2<0<DKPRTL3<DKPRTL4<DKPRTL5 hold.

At the following step S222, it is determined whether or not the delay flag FPRTDLY is equal to "1". If FPRTDLY=0 holds, which means that the control mode has just been inverted from the rich-side deflection control to the lean-side deflection control, the rich-side correction term DKPRTR is added to the rich-side duration correction coefficient KPRTR at a step S223. On the other hand, if FPRTDLY=1 holds, which means that the control mode has just been inverted from the lean-side deflection control to the rich-side deflection control, the lean-side correction term DKPRTL is added to the lean-side duration correction coefficient KPRTL at a step S224, followed by the program proceeding to a step S225.

At the step S225 et seq., limit-checking of the above calculated duration correction coefficient KPRTi is carried out. More specifically, if the duration correction coefficient KPRTi exceeds the predetermined upper limit value KPRTLMTH, the KPRTi value is set to the predetermined upper limit value KPRTLMTH at the step S225 and a step S226. If the KPRTi value is below the predetermined lower limit value KPRTLMTL, the KPRTi value is set to the predetermined lower limit value KPRTLMTL at steps S227 and S228. If the KPRTi value falls within the above-mentioned range, the program is immediately terminated.

According to the process of FIGS. 13 and 14, as described above, the rich-side duration correction coefficient KPRTR and the lean-side duration correction coefficient KPRTL are independently changed, to change the repetition period of perturbation, and therefore the perturbation can be carried out in a manner suitable for the purification capacity of the exhaust gas-purifying device 13. As a result, the performance of the exhaust gas-purifying device can be exhibited to the maximum extent, to thereby enhance exhaust emission characteristics of the engine. Further, even if the central value of perturbation deviates from a desired value due to deviation of the output characteristic of the LAF sensor 14, the central value of perturbation can be always kept to the optimum value by independently changing the rich-side duration TPRTR and the lean-side duration TPRTL.

Further, if the zone parameter SFZONE is set to 3, which means that the O2 sensor output SVO2 is equal to or in the vicinity of the reference value SVREF, the correction terms DKPRTR and DKPRTL are each set to a positive value with a small absolute value. Therefore, the correction amount of the duration correction coefficient KPRTi per one time of correction can be made small (see time periods before a time point t11 and after a time point t14 in FIG. 16).

Further, if SFBZONE=2 holds and at the same time the O2 sensor output SVO2 is being decreased (a time period between time points t11 and t12 in FIG. 16), or if SFBZONE=1 holds, which means that the O2 sensor output SVO2 largely deviates to the lean side (a time period between time points t12 and t13 in FIG. 16), the rich-side correction term DKPRTR is set to the first predetermined value DKPRTR1 which is a relatively large positive value, while the lean-side correction term DKPRTL is set to the first predetermined value DKPRTL1 which is a negative value with a relatively large absolute value. Therefore, the correction amount of the duration correction coefficient KPRTi per one time of correction becomes larger, which leads to prompt correction of both the rich-side duration TPRTR and the lean-side duration TPRTL.

When the O2 sensor output SVO2 continues to be increased by the above correction into the range of SFBZONE=2 (a time period between time points t13 and t14 in FIG. 16), the correction terms DKPRTR and DKPRTL are respectively set to the second predetermined values DKPRTR2 and DKPRTL2 with smaller absolute values. Therefore, the correction amount of the duration correction coefficient KPRTi per one time of correction becomes smaller, and after the time point t14 in FIG. 16, the SVO2 value falls into the range of SFBZONE=3.

Figure 16:
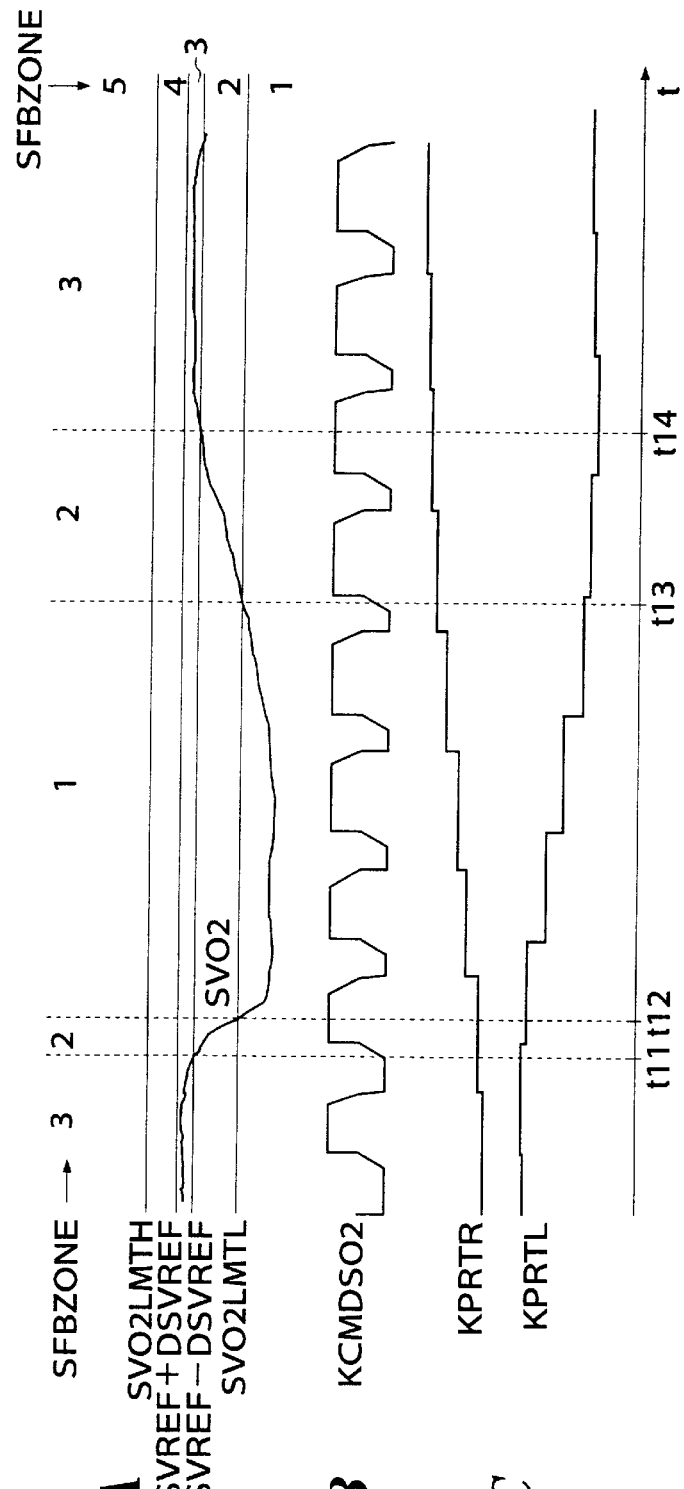

If the O2 sensor output VSO2 largely deviates in the rich-side direction, through not indicated in FIG. 16, the duration correction coefficients KPRTR and KPRTL are corrected in the directions respectively opposite to the directions shown in FIG. 16, and the correction amount per one time of correction is set to the respective larger values (DKPRTR5 and DKPRTL5) when SFBZONE=4 holds and at the same time the SVO2 value is being increased, or when SFBZONE=5 holds. On the other hand, when the SVO2 value is decreased to fall into the SFBZONE4 range, the correction amount is set to the respective smaller values (DKPRTR4 and DKPRTL4).

Figure 17:
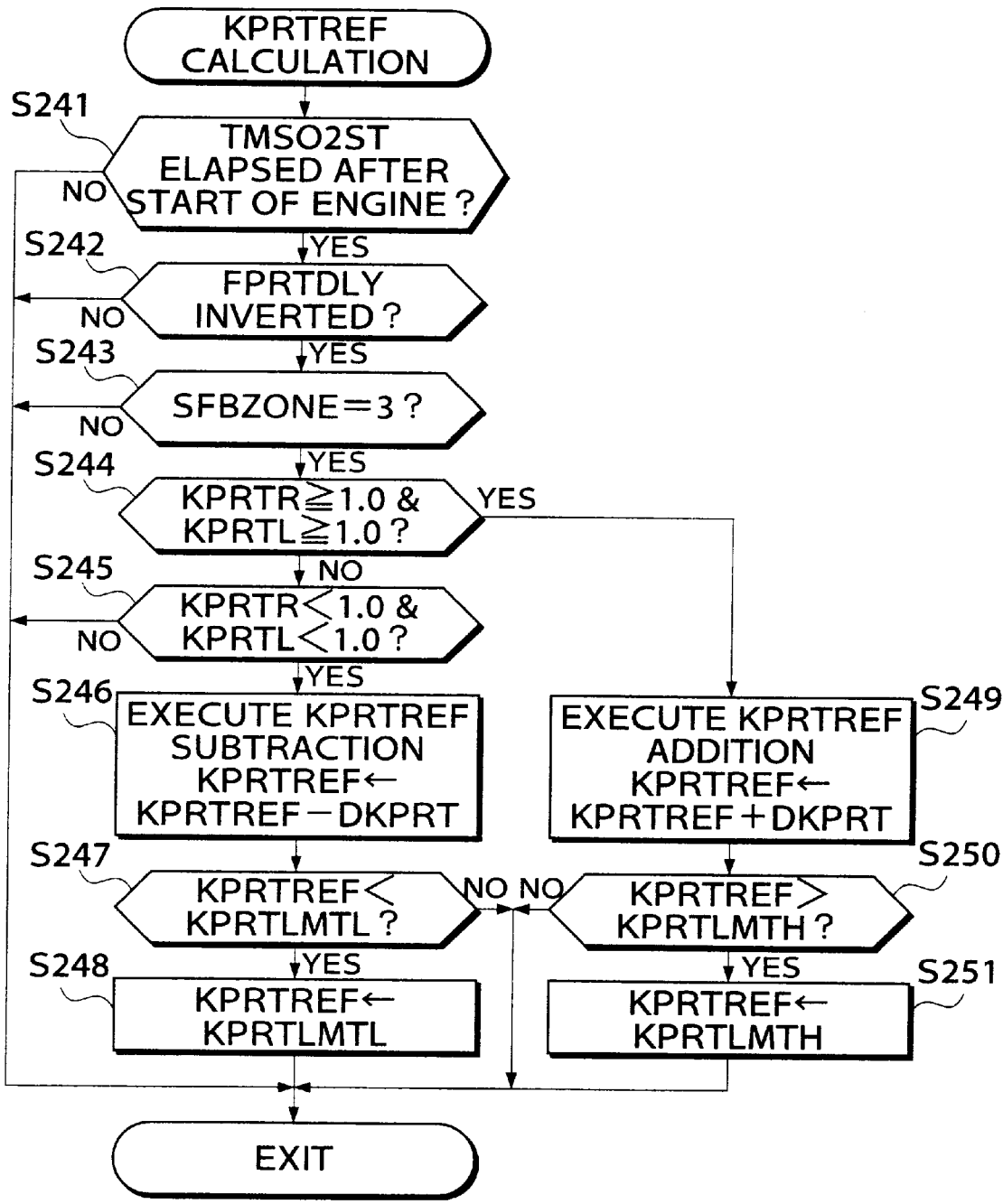
FIG. 17 is a flowchart showing a subroutine for calculating a learned value KPRTREF of the duration correction coefficient KPRTi, which is executed at a step S68 in FIG. 5.

FIG. 17 shows a subroutine for carrying out the KPRTREF-calculating process, which is executed at the step S68 in FIG. 5.

First, it is determined at a step S241 whether or not a predetermined time period TMSO2ST (e.g. 180 sec) has elapsed after the start of the engine, and if the time period TMSO2ST has not elapsed, the program is immediately terminated. This step is provided taking into account that the condition of the catalyst in the exhaust gas-purifying device 13 is not stabilized immediately after the start of the engine. After the predetermined time period TMSO2ST has elapsed, it is determined at a step S242 whether or not the delay flag FPRTDLY has been inverted. If the present loop of execution of this step is immediately after the inversion, it is determined at a step S243 whether or not the zone parameter SFBZONE assumes "3". If the present loop is not immediately after the inversion of the delay flag FPRTDLY or if SFBZONE=3 does not hold, the program is immediately terminated.

If the present loop is immediately after the inversion of the delay flag FPRTDLY and at the same time SFBZONE=3 holds, it is determined at a step S244 whether or not the rich-side duration correction coefficient KPRTR and the lean-side duration correction coefficient KPRTL both exceed 1.0. If at least one of the correction coefficients KPRTR and KPRTL is below 1.0, it is determined at a step S245 whether or not the correction coefficients KPRTR are KPRTL are both below 1.0. If one of the correction coefficients KPRTR and KPRTL exceeds 1.0 and the other is below 1.0, the program is immediately terminated. If the both values are below 1.0, the learned value KPRTREF is corrected at a step S426, whereas if the both values exceed 1.0, the learned value KPRTREF is corrected at a step S429.

At the step S246, the correction term DKPRT is subtracted from the learned value KPRTREF calculated up to the last loop, to thereby obtain an updated value of the learned value KPRTREF. The reason why the duration correction coefficient KPRTR and KPARTL both assume values below 1.0 is as follows: The zone parameter SFBZONE=4 or SFBZONE=5 holds immediately after termination of the rich-side deflection control, and therefore the rich-side duration correction coefficient KPRTR is corrected in the decreasing direction, while the zone parameter SFBZONE=1 or 2 holds immediately after termination of the lean-side deflection control, and therefore the lean-side duration correction coefficient KPRTL is corrected in the decreasing direction. In other words, the duration correction coefficient KPRTR and KPARTL both assume values below 1.0 when the oxygen storage capacity of the exhaust gas-purifying device has lowered.

Then, it is determined at a step S247 whether or not the decreased learned value KPRTREF is smaller than the predetermined lower limit value KPRTLMTL. If KPRTREF≧KPRTLMTL holds, the program is immediately terminated, whereas if KPRTREF<KPRTLMTL holds, the learned value KPRTREF is set to the lower limit value KPRTLMTL at a step S248, followed by terminating the present routine.

On the other hand, at the step S249, the correction term DKPRT is added to the learned value KPRTREF calculated up to the last loop, to thereby obtain an updated value of the learned value KPRTREF. The reason why the duration correction coefficients KPRTR and KPARTL both assume values exceeding 1.0 is as follows: The zone parameter SFBZONE=1, SFBZONE=2, or SFBZONE=3 holds immediately after termination of the rich-side deflection control, and therefore the rich-side duration correction coefficient KPRTR is corrected in the increasing direction, while the zone parameter SFBZONE=1, SFBZONE=2, or SFBZONE=3 holds immediately after termination of the lean-side deflection control, and therefore the lean-side duration correction coefficient KPRTR is corrected in the increasing direction. In other words, the duration correction coefficients KPRTR and KPARTL both assume values exceeding 1.0 when the oxygen storage capacity of the exhaust gas-purifying device 13 is larger than an originally expected value.

The basic duration TMPRT map retrieved at the step S104 in FIG. 8 is set on the assumption that the catalyst of the exhaust gas-purifying device 13 is slightly deteriorated, and the "originally expected value" means the oxygen storage capacity corresponding to the set map value. That is, if the basic duration TMPRT map is set on the assumption that the catalyst is fresh and new, when a deteriorated catalyst is used, it can cause degraded exhaust emission characteristics of the engine before the effect of the learning is obtained.

Then, it is determined at a step S250 whether or not the increased learned value KPRTREF is larger than the predetermined upper limit value KPRTLMTH. If KPRTREF≦KPRTLMTH holds, the program is immediately terminated, whereas if KPRTREF>KPRTLMTH holds, the learned value KPRTREF is set to the lower limit value KPRTLMTH at a step S251, followed by terminating the present routine.

According to the FIG. 17 process, as described above, when the rich-side duration correction coefficient KPRTR and the lean-side duration correction coefficient KPRTL both exceed 1.0, the learned value KPRTREF is corrected in the increasing direction, whereas when the KPRTR and KPRTL values are both below 1.0, the learned value KPRTREF is corrected in the decreasing direction. Thus, if a difference occurs between the oxygen storage capacity of the exhaust gas-purifying device which was originally expected and the actual storage capacity of the same, the learned value KPRTREF is corrected according to the difference, and therefore the optimum learned value corresponding to the oxygen storage capacity can be obtained. As a result, the performance of the exhaust gas-purifying device can be exhibited to the maximum extent, to obtain good exhaust emission characteristics of the engine.

The learned value KPRTREF is stored in a RAM backed-up by a battery of the vehicle, which is used as an initial value of the duration correction coefficient KPRTi in the next operation of the engine (see the step S27 in FIG. 4 and the step S221 in FIG. 14). When the battery is removed, the initial value is set to 1.0.

Next, description will be made of the KAF-calculating process with reference to FIGS. 18 to 19, i.e. the process of calculating the air-fuel ratio correction coefficient KAF in response to the output from the LAF sensor 14. This process is executed at the step S2 in FIG. 2.

Figure 18:
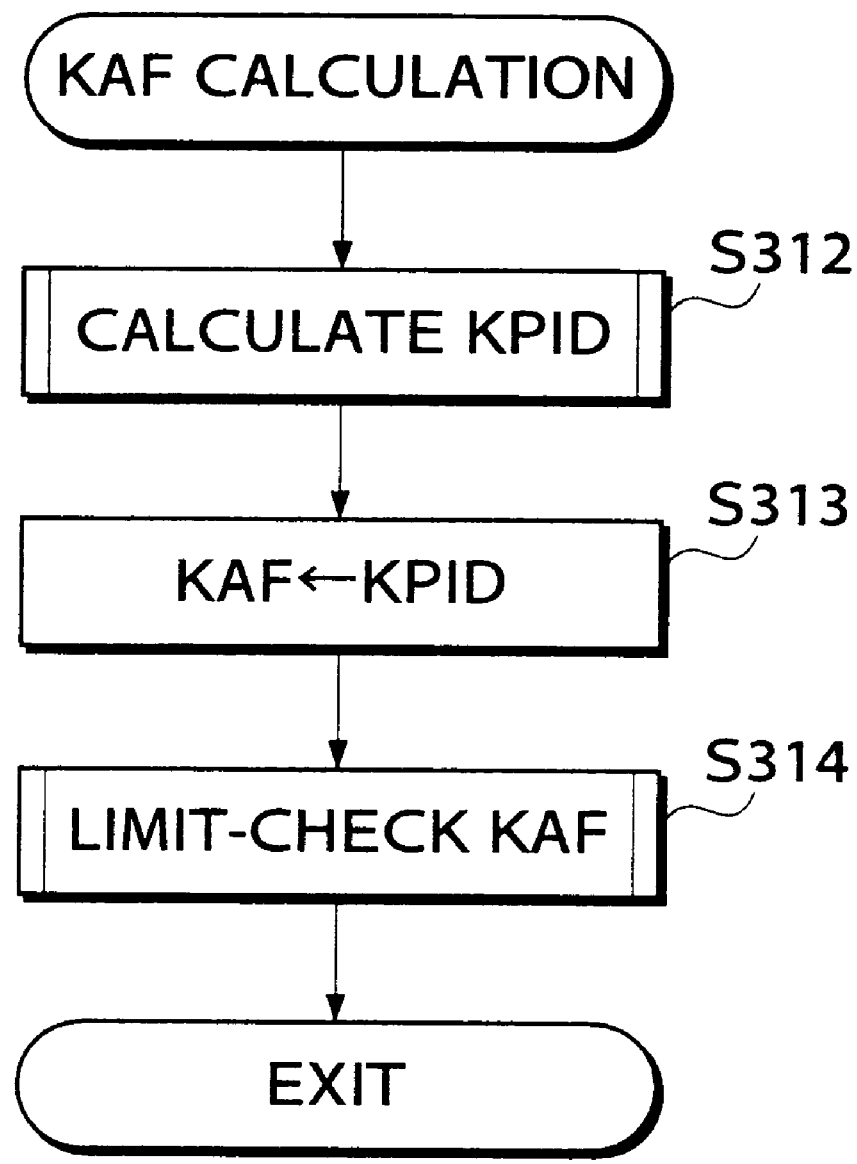
FIG. 18 is a flowchart showing a routine for carrying out the KAF calculation, which is executed at a step S2 in FIG. 2.

FIG. 18 shows a program for calculating the KAF value. First, at a step S312, a KPID-calculating process for calculating a PID correction coefficient KPID (described with reference to FIG. 19) is executed. Then, at a step S313, the air-fuel ratio correction coefficient KAF is set to the PID correction coefficient KPID calculated at the step S312, and at a step S314, limit-checking of the KAF value is carried out to limit the KAF value within a range between predetermined upper and lower limit values, followed by terminating the present routine.

Figure 19:
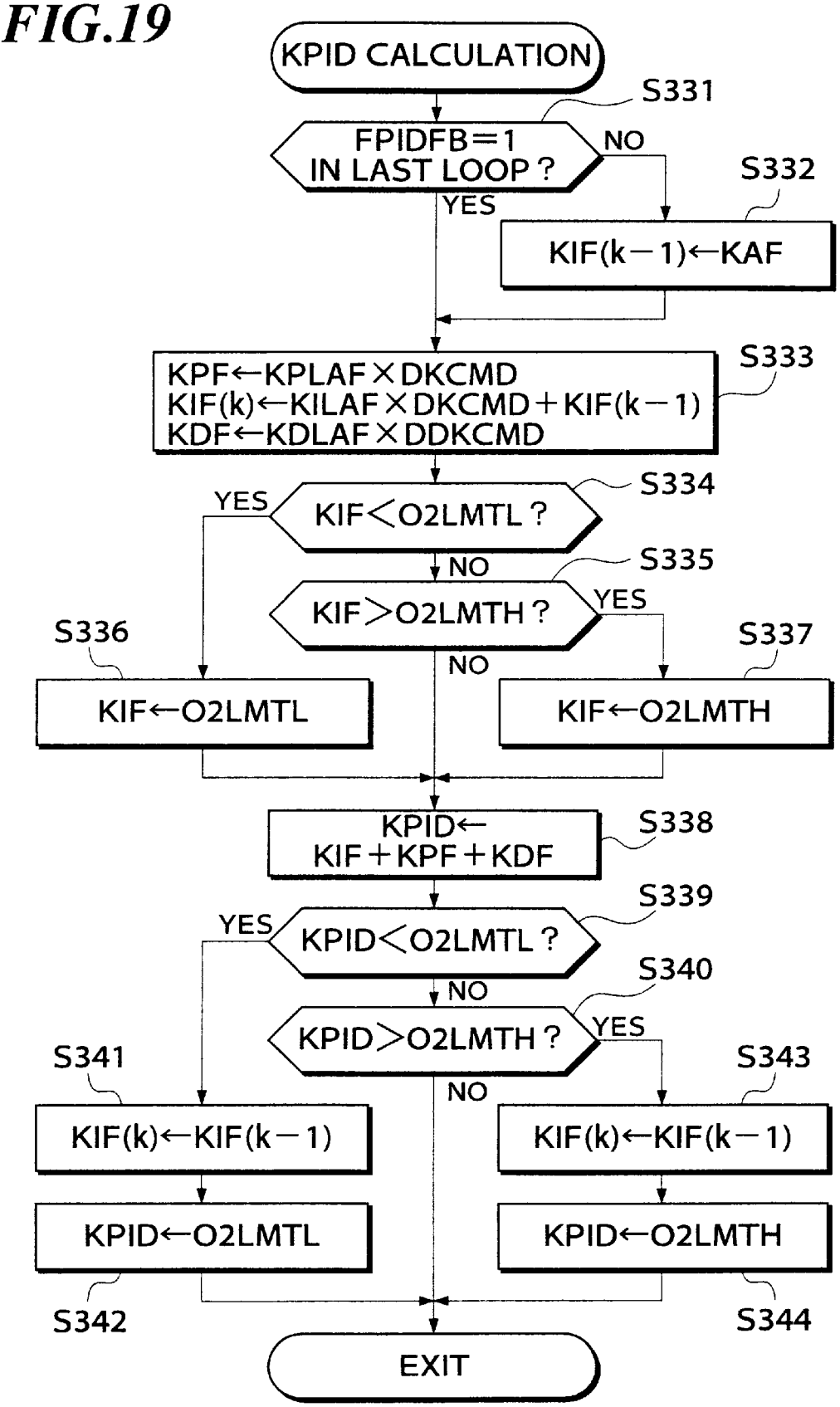
FIG. 19 is a subroutine for calculating a PID correction coefficient KPID, which is executed at a step S312 in FIG. 18.

FIG. 19 shows a subroutine for carrying out the KPID-calculating process, which is executed at the step S312 in FIG. 18.

At a step S331, it is determined whether or not the PID control flag FPIDFB was set to "1" in the last loop of execution of this routine. If FPIDFB=1 holds, the program immediately proceeds to a step S333, whereas if FPIDFB=0 holds, a last value KIF(k−1) of an integral term KIF used in the PID control is set to the air-fuel ratio correction coefficient KAF at a step S332, followed by the program proceeding to the step S333.

At the step S333, a proportional term KPF, the integral term KIF, and a differential term KDF are calculated by the use of the following equations (9A) to (9C):

$$KPF = KPLAF \times DKCMD \quad (9A)$$

$$KIF(k) = KILAF \times DKCMD + KIF(k-1) \quad (9B)$$

$$KDF = KDLAF \times DDKCMD \quad (9C)$$

where KPLAF, KILAF, and KDLAF represent control gains. DKCMD represents the difference between the desired air-fuel ratio and the actual air-fuel ratio, and more specifically, DKCMD represents the difference (=KCMD−KACT) between the desired equivalent ratio (desired air-fuel ratio coefficient) KCMD and an actual equivalent ratio KACT calculated in response to the output from the LAF sensor 14. DDKCMD represents a rate of change (=DKCMD(k)−DKCMD(k−1)) in the difference DKCMD.

At the following steps S334 to S337, limit-checking of the integral term KIF is carried out. More specifically, if the KIF value falls within a range between predetermined upper and lower limit values O2LMTH and O2LMTL, i.e. O2LMTL≦KIF≦O2LMTH holds, the program immediately proceeds to a step S338. If KIF<O2LMTL holds, the KIF value is set to the O2LMTL value at the step S3356, and then the program proceeds to the step S338. On the other hand, if KIF>O2LMTH holds, the KIF value is set to the O2LMTH value at the step S337, followed by the program proceeding to the step S338.

At the step S338, the integral term KIF, the proportional term KPF, and the differential term KDF are added together, to thereby calculate the PID correction coefficient KPID. Then, it is determined at a step S339 whether or not the PID correction coefficient KPID is smaller than the predetermined lower limit value O2LMTL. If KPID<O2LMTL holds, the integral term KIF is held at a last value thereof at a step S341, and the PID correction coefficient KPID is set to the predetermined lower limit value O2LMTL at a step S342, followed by terminating the present routine. On the other hand, if KPID≧O2LMTL holds, it is determined at a step S340 whether or not the PID correction coefficient KPID is larger than the predetermined upper limit value O2LMTH. If KPID≦O2LMTH holds, the program is immediately terminated. On the other hand, if KPID>O2LMTH holds, the integral term KIF is held at a last value thereof at a step S343, and the PID correction coefficient KPID is set to the upper limit value O2LMTH at a step S344, followed by terminating the present routine.

According to the FIG. 19 process, as described above, the PID correction coefficient KPID is calculated through the PID control such that the actual equivalent ratio KACT becomes equal to the desired equivalent ratio KCMD.

This invention is not limited to the embodiment described above, but various modifications or variations thereof are possible. For example, in the above described embodiment, the air-fuel ratio is feedback-controlled through the PID control, but it may be feedback-controlled through adaptive control.

Further, according to the above embodiment, the feedback control is carried out such that the actual equivalent ratio KACT based on the LAF sensor output becomes equal to the desired air-fuel ratio coefficient KCMD by using the air-fuel ratio correction coefficient KAF. However, the perturbation of the air-fuel ratio may be carried out by applying only the desired air-fuel ratio coefficient KCMD to the equation (1), without using the air-fuel ratio correction coefficient KAF.

What is claimed is:

1. In an air-fuel ratio control system for an internal combustion engine having an exhaust system, and exhaust gas-purifying means arranged in said exhaust system, including an oxygen concentration sensor arranged either in said exhaust system at a location downstream of said exhaust gas-purifying means or in said exhaust gas-purifying means, and air-fuel ratio perturbation means for periodically changing an air-fuel ratio of a mixture supplied to said engine alternately to a rich side and to a lean side with respect to a stoichiometric air-fuel ratio, the improvement comprising:

purification capacity-determining means for determining purification capacity of said exhaust gas-purifying means, based on output from said oxygen concentration sensor; and repetition period-changing means for shortening a repetition period of said periodical changing of said air-fuel ratio by said air-fuel ratio perturbation means as said purification capacity determined by said purification capacity-determining means is deteriorated.

2. An air-fuel ratio control system as claimed in claim 1, including an air-fuel ratio sensor arranged in said exhaust system at a location upstream of said exhaust gas-purifying means, for outputting a signal proportional to concentration of oxygen present in exhaust gases emitted from said engine, and feedback control means for carrying out feedback control of said air-fuel ratio of said mixture supplied to said engine in response to an output from said air-fuel ratio sensor such that said air-fuel ratio becomes equal to a desired air-fuel ratio, and wherein said air-fuel ratio perturbation means periodically changes said desired air-fuel ratio.

3. An air-fuel ratio control system as claimed in claim 1, wherein said purification capacity-determining means determines said purification capacity of said exhaust gas-purifying means, based on a time period elapsed from a time point said air-fuel ratio is deflected from said rich side to said lean side with respect to said stoichiometric air-fuel ratio, or vise versa, to a time point said output from said oxygen concentration sensor actually changes.

4. An air-fuel ratio control system as claimed in claim 1, wherein said repetition period-changing means prolongs at least one of a rich-side duration over which said air-fuel ratio is continuously deflected to said rich side by said air-fuel ratio perturbation means and a lean-side duration over which said air-fuel ratio is continuously deflected to said lean side by said air-fuel ratio perturbation means when a rich-side duration correction coefficient for correcting said rich-side duration and a lean-side duration correction coefficient for correcting said lean-side duration both exceed a predetermined value, said repetition period-changing means shortening at least one of said rich-side duration and said lean-side duration when said rich-side duration correction coefficient and said lean-side duration correction coefficient are both below said predetermined value.

5. An air-fuel ratio control system as claimed in claim 4, including learning means for calculating a learned value of said rich-side duration correction coefficient and said lean-side duration correction coefficient, said learned value being increased or decreased depending upon a relationship between said rich-side and lean-side duration correction coefficients and a predetermined non-corrective value.

6. An air-fuel ratio control system as claimed in claim 4, wherein said learned value is used as an initial value of said rich-side duration correction coefficient and said lean-side duration correction coefficient.

7. In an air-fuel ratio control system for an internal combustion engine having an exhaust system, and exhaust gas-purifying means arranged in said exhaust system, including an oxygen concentration sensor arranged either in said exhaust system at a location downstream of said exhaust gas-purifying means or in said exhaust gas-purifying means, and air-fuel ratio perturbation means for periodically changing an air-fuel ratio of a mixture supplied to said engine alternately to a rich side and to a lean side with respect to a stoichiometric air-fuel ratio, the improvement comprising:

purification capacity-determining means for determining purification capacity of said exhaust gas-purifying means, based on an output from said oxygen concentration sensor; and repetition period-changing means for shortening a repetition period of said periodical changing of said air-fuel ratio by said air-fuel ratio perturbation means as said purification capacity determined by said purification capacity-determining means is deteriorated, wherein said repetition period-changing means prolongs at least one of a rich-side duration over which said air-fuel ratio is continuously deflected to said rich side by said air-fuel ratio perturbation means and a lean-side duration over which said air-fuel ratio is continuously deflected to said lean side by said air-fuel ratio perturbation means when a rich-side duration correction coefficient for correcting said rich-side duration and a lean-side duration correction coefficient for correcting said lean-side duration both exceed a predetermined value, said repetition period-changing means shortening at least one of said rich-side duration and said lean-side duration when said rich-side duration correction coefficient and said lean-side duration correction coefficient are both below said predetermined value.

8. An air-fuel ratio control system as claimed in claim 7, including learning means for calculating a learned value of said rich-side duration correction coefficient and said lean-side duration correction coefficient, said learned value being increased or decreased depending upon a relationship between said rich-side and lean-side duration correction coefficients and a predetermined non-corrective value.

9. An air-fuel ratio control system as claimed in claim 8, wherein said learned value is used as an initial value of said rich-side duration correction coefficient and said lean-side duration correction coefficient.

10. In an air-fuel ratio control system for an internal combustion engine having an exhaust system, and exhaust gas-purifying means arranged in said exhaust system, including an oxygen concentration sensor arranged either in said exhaust system at a location downstream of said exhaust gas-purifying means or in said exhaust gas-purifying means, and air-fuel ratio perturbation means for periodically changing an air-fuel ratio of a mixture supplied to said engine alternately to a rich side and to a lean side with respect to a stoichiometric air-fuel ratio, the improvement comprising:

purification capacity-determining means for determining purification capacity of said exhaust gas-purifying means, based on an output from said oxygen concentration sensor; and repetition period-changing means for shortening a repetition period of said periodical changing of said air-fuel ratio by said air-fuel ratio perturbation means based upon a degree of deterioration of said purification capacity which is determined by said purification capacity-determining means.

* * * * *